(12) United States Patent
Sigelakis et al.

(10) Patent No.: US 9,382,696 B2
(45) Date of Patent: Jul. 5, 2016

(54) LOCKING FIRE HYDRANT

(71) Applicant: Sigelock Systems, L.L.C., East Rockaway, NY (US)

(72) Inventors: George Sigelakis, East Rockaway, NY (US); Matthew Hayduk, Glen Cove, NY (US)

(73) Assignee: Sigelock Systems, LLC, Oceanside, NY (US)

( * ) Notice: Subject to any disclaimer, the term of this patent is extended or adjusted under 35 U.S.C. 154(b) by 0 days.

(21) Appl. No.: 14/622,404

(22) Filed: Feb. 13, 2015

(65) Prior Publication Data
US 2015/0152625 A1 Jun. 4, 2015

Related U.S. Application Data

(62) Division of application No. 13/740,034, filed on Jan. 11, 2013, now Pat. No. 8,967,184, which is a division of application No. 12/482,366, filed on Jun. 10, 2009, now Pat. No. 8,365,759.

(51) Int. Cl.
| | |
|---|---|
| *E03B 9/06* | (2006.01) |
| *E03B 9/02* | (2006.01) |
| *F16K 35/10* | (2006.01) |
| *F16K 27/00* | (2006.01) |

(52) U.S. Cl.
CPC ... *E03B 9/06* (2013.01); *E03B 9/02* (2013.01); *F16K 27/006* (2013.01); *F16K 35/10* (2013.01); *Y10T 29/53687* (2015.01); *Y10T 70/554* (2015.04); *Y10T 70/5562* (2015.04); *Y10T 70/5575* (2015.04); *Y10T 137/0407* (2015.04); *Y10T 137/5468* (2015.04); *Y10T 137/7069* (2015.04); *Y10T 137/7256* (2015.04); *Y10T 137/9247* (2015.04)

(58) Field of Classification Search
CPC .............. E03B 9/06; E03B 9/10; F16K 35/10
See application file for complete search history.

(56) References Cited

U.S. PATENT DOCUMENTS

| | | | | |
|---|---|---|---|---|
| 468,782 | A * | 2/1892 | Brentano | 137/296 |
| 2,019,393 | A * | 10/1935 | Carah | 340/545.6 |
| 2,146,968 | A * | 2/1939 | Macagno | 292/144 |
| 3,626,961 | A * | 12/1971 | Quinones | 137/296 |
| 4,777,811 | A * | 10/1988 | Binkley et al. | 70/178 |
| 6,688,326 | B1 * | 2/2004 | Sigelakis | 137/296 |

* cited by examiner

*Primary Examiner* — Kevin Murphy
(74) *Attorney, Agent, or Firm* — Martine Penilla Group, LLP

(57) ABSTRACT

A locking fire hydrant includes a fire hydrant body having an internal channel extending between a main cap recess and an auxiliary cap recess defined therein. A plunger assembly including first and second plungers is disposed within the internal channel. The first plunger is disposed such that an end thereof is capable of extending into a main cap recess and the second plunger is disposed such that an end thereof is capable of extending into an auxiliary cap recess. When the second plunger is actuated by mounting a locking cap on the fire hydrant body, one of the ratchet teeth provided on the back side of the auxiliary cap engages the second plunger to prevent the auxiliary cap from being removed from the fire hydrant body. A locking cap, an opening tool, and methods of securing an auxiliary cap to a fire hydrant also are described.

17 Claims, 18 Drawing Sheets

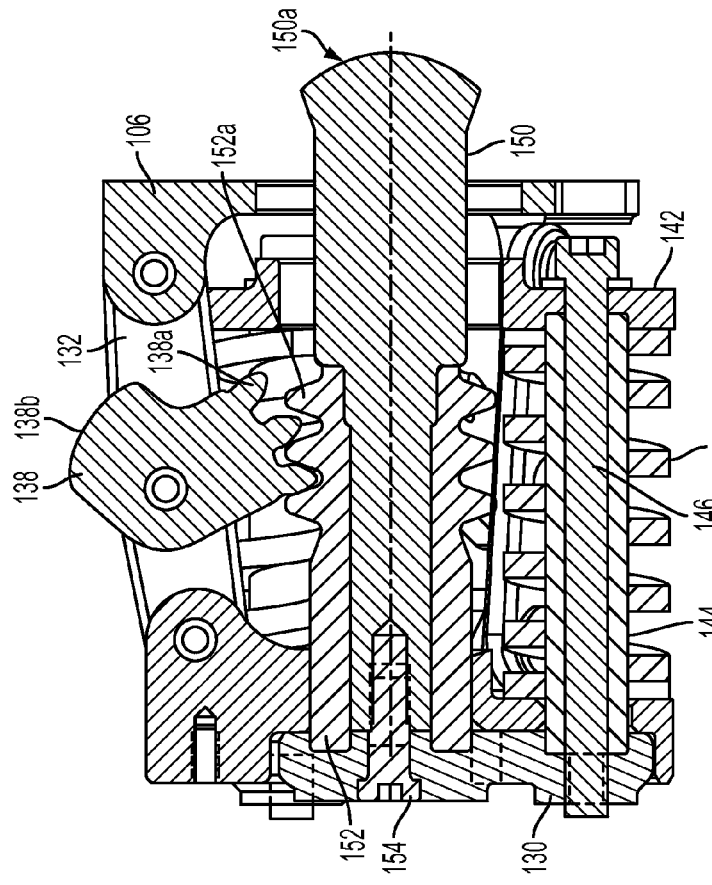
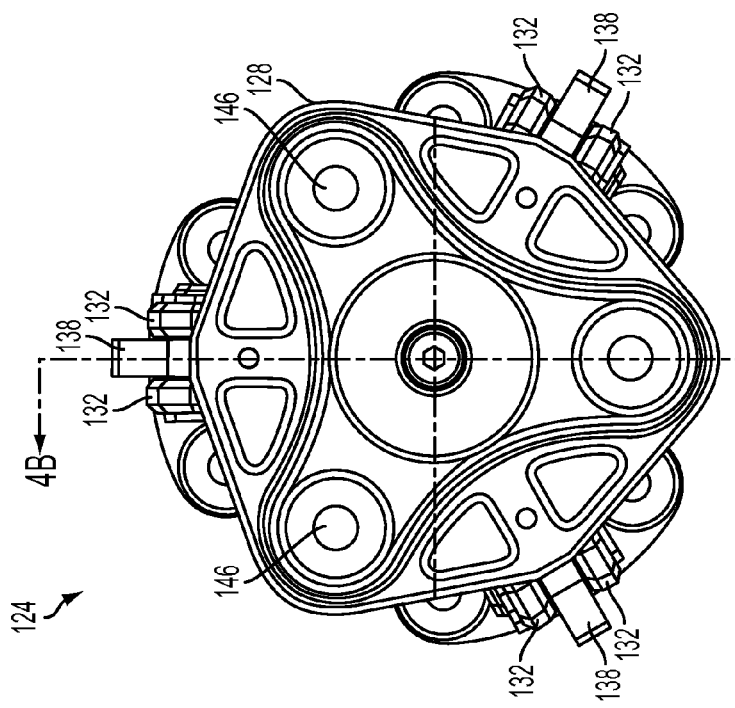
FIG. 4B
FIG. 4A

LOCKING FIRE HYDRANT

CROSS-REFERENCE TO RELATED APPLICATION

This application is a divisional of and claims priority from application Ser. No. 12/482,366, filed Jun. 10, 2009, the disclosure of which is incorporated herein by reference for all purposes. This application is a divisional of and claims priority from application Ser. No. 13/740,034, filed Jan. 11, 2013, the disclosure of which is incorporated herein by reference for all purposes.

BACKGROUND

The present invention relates generally to fire hydrants and, more particularly, to a locking fire hydrant.

Firefighters need quick and reliable access to water to fight fires safely and effectively. Unfortunately, it is relatively easy for unauthorized users to gain access to currently installed fire hydrants. Unauthorized use of fire hydrants is problematic for several reasons. First, unauthorized use of fire hydrants wastes water. Second, unauthorized use of fire hydrants can lower the water pressure to the point that water cannot be moved from the fire hydrant to the engine pumper, which endangers firefighters and the communities they serve. Third, in the process of gaining access to a fire hydrant, unauthorized users can damage the fire hydrant to the point that it must be either repaired or replaced. Thus, to ensure that water is readily available when needed, communities must expend significant amounts of labor and financial resources to repair and replace fire hydrants damaged by unauthorized users.

In view of the foregoing, there is a need for a fire hydrant that can effectively withstand repeated attempts to gain unauthorized access thereto.

SUMMARY

Broadly speaking, the present invention fills this need by providing a locking fire hydrant which includes a locking cap that has self-centering capability, and an internal latching mechanism that can be actuated by the locking cap to secure an auxiliary cap to the fire hydrant.

In accordance with one aspect of the invention, a locking fire hydrant is provided. The locking fire hydrant includes a fire hydrant body having a head that defines a hollow interior. The head has a main outlet port, an auxiliary outlet port, and a valve access hole. The head also has an outer surface configured to define a main cap recess that surrounds the main outlet port, an auxiliary cap recess that surrounds the auxiliary outlet port, and a valve access channel that extends between the main cap recess and the valve access hole. The head further has an internal channel defined therein, with the internal channel extending between the main cap recess and the auxiliary cap recess.

A locking cap is mounted on the fire hydrant body, with the locking cap being configured to close off the main outlet port and the valve access hole. A plunger assembly is disposed within the internal channel defined in the head of the fire hydrant body, with the plunger assembly including first and second plungers moveably disposed within a sleeve. The first plunger is disposed such that an end thereof is capable of extending into the main cap recess and the second plunger is disposed such that an end thereof is capable of extending into the auxiliary cap recess. An auxiliary cap is mounted on the fire hydrant body, with the auxiliary cap being configured to close off the auxiliary outlet port. The auxiliary cap has a plurality of ratchet teeth on the back side thereof. One of the ratchet teeth engages the second plunger to prevent the auxiliary cap from being removed from the fire hydrant body.

In one embodiment, the auxiliary cap is threadably mounted on the fire hydrant body by rotating the auxiliary cap in a first direction, and one of the ratchet teeth engages the second plunger to prevent the auxiliary cap from being rotated in a second direction that is opposite to the first direction. In one embodiment, the first direction is a clockwise direction and the second direction is a counterclockwise direction. In one embodiment, the plurality of ratchet teeth is radially disposed around a peripheral portion of the back side of the auxiliary cap. In one embodiment, each of the ratchet teeth has a leading face and a trailing face. Each leading face defines a ramped surface having a compound angle including an axial component and a radial component relative to an axis of the auxiliary cap, and each trailing face defines a surface that is parallel to the axis of the side cap.

In one embodiment, the locking cap includes a locking mechanism configured to enable self-centering of the locking cap. In one embodiment, the locking cap includes a cap body, and a locking mechanism coupled to the cap body, with the locking mechanism having at least three cam gears radially distributed around the locking mechanism.

In accordance with another aspect of the invention, a locking cap for a fire hydrant is provided. The locking cap includes a cap body and a locking mechanism coupled to the cap body. The locking mechanism includes at least three cam gears radially distributed around the locking mechanism, with each cam gear being rotatably fastened to a support structure of the locking mechanism. In addition, each cam gear has a cam surface, and gear teeth for engaging a moveable rack.

In one embodiment, the locking cap includes three cam gears, and the three cam gears are uniformly radially distributed around the locking mechanism. In one embodiment, the locking cap includes three cam gears, and the three cam gears are non-uniformly radially distributed around the locking mechanism.

In one embodiment, the cap body has a central aperture, and the locking cap further includes an actuator pin extending through the central aperture to the moveable rack. In one embodiment, the cam surface of each cam gear is configured to rotatably engage an inner surface of a fire hydrant. In one embodiment, the locking cap further includes at least one spring coupled to at least one of the cam gears to hold the cam gears in a locked position.

In accordance with yet another aspect of the invention, a first method for securing an auxiliary cap to a fire hydrant is provided. In this method, a locking cap for closing off a main outlet port of a fire hydrant is mounted on the fire hydrant to actuate an internal latching mechanism to engage an area proximate to an auxiliary outlet port of the fire hydrant. In one embodiment, the method further includes mounting an auxiliary cap for closing off the auxiliary outlet port on the fire hydrant, with the auxiliary cap engaging the internal latching mechanism engaged in the area proximate to the auxiliary outlet port. In one embodiment, the auxiliary cap is provided with teeth for engaging the internal latching mechanism.

In accordance with a further aspect of the invention, a second method for securing an auxiliary cap to a fire hydrant is provided. In this method, force is applied to a first plunger disposed proximate to a main outlet port of a fire hydrant to cause a second plunger to assume an extended position in which the second plunger extends into an area proximate to an auxiliary outlet port of the fire hydrant. Thereafter, an auxiliary cap for closing off the auxiliary port is allowed to be threadably fastened to the fire hydrant by rotating the auxiliary cap in a first direction while the second plunger is in the extended position. The auxiliary cap is prevented from being threadably removed from the fire hydrant by rotating the auxiliary cap in a second direction while the second plunger is in the extended position. The force applied to the first plunger is released to cause the second plunger to retract from the extended position. Thereafter, the auxiliary cap is threadably removed from the fire hydrant by rotating the auxiliary cap in the second direction.

In one embodiment, the first direction is a clockwise direction and the second direction is a counterclockwise direction. In one embodiment, the force applied to the first plunger is applied by mounting a locking cap for closing off the main outlet port to the fire hydrant. In one embodiment, the force applied to the first plunger is released by removing the locking cap from the fire hydrant. In one embodiment, the auxiliary cap for closing off the auxiliary port is allowed to be threadably fastened to the fire hydrant by causing ratcheting movement of the second plunger during rotation of the auxiliary cap.

In accordance with a still further aspect of the invention, an opening tool for a locking cap of a fire hydrant is provided. The opening tool includes a collar having a plurality of protrusions and a main support portion coupled to the collar. The opening tool also includes a guide supported by the main support portion. The guide includes a shaft support, and a pin is moveably disposed within the guide. The opening tool further includes a cam lever rotatably coupled to the guide by a shaft that extends through the cam lever. The shaft is supported by the shaft support. The cam lever includes a cam surface in contact with an end of the pin. The cam surface includes a first flat surface, a second flat surface, and a curved surface that extends between the first flat surface and the second flat surface.

In one embodiment, the opening tool further includes a housing supported by the main support portion, with the housing enclosing the guide. In one embodiment, the opening tool further includes a pair of handles, with each of the handles extending from the main support portion to the housing.

In one embodiment, a roller is provided at the end of the pin so that the cam surface is in contact with the roller. In one embodiment, the roller is a roller bearing. In one embodiment, the pin is comprised of an inner pin and an outer pin. In one embodiment, a spring is disposed between the inner pin and the outer pin.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments and together with the description serve to explain the principles of the invention, as claimed.

FIG. 4A is a front view of a locking mechanism, in accordance with one embodiment of the invention.

FIG. 4B is a cross-sectional view of the locking mechanism taken across section 4B-4B shown in FIG. 4A, in accordance with one embodiment of the invention.

DETAILED DESCRIPTION

Several exemplary embodiments will now be described in detail with reference to the accompanying drawings.

Figure 1:
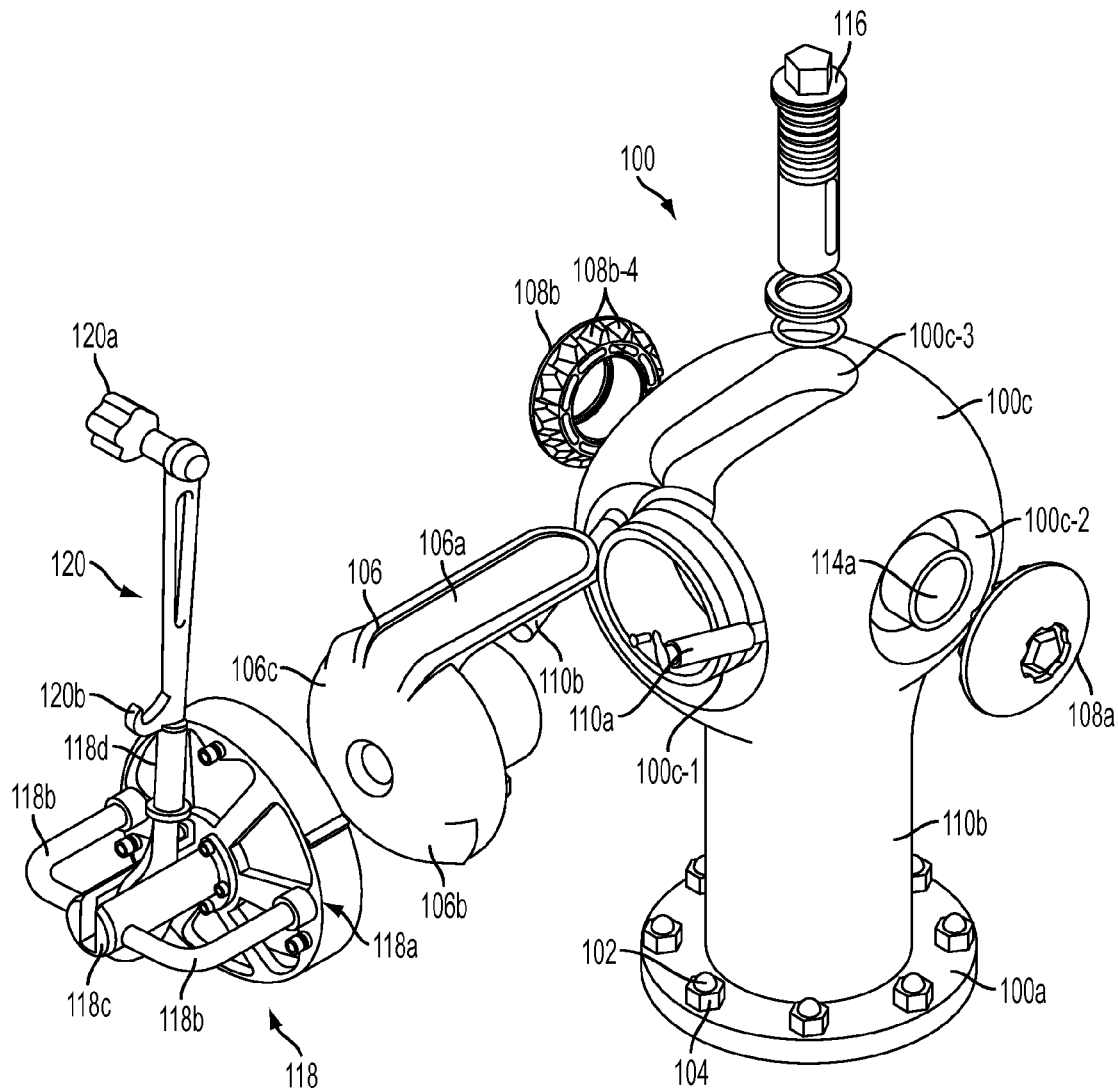
FIG. 1 is an exploded view of the components of a locking fire hydrant and opening tool, in accordance with one embodiment of the invention.

FIG. 1 is an exploded view of the components of a locking fire hydrant and opening tool, in accordance with one embodiment of the invention. As shown in FIG. 1, the locking fire hydrant includes fire hydrant body 100, which is fastened to a standpipe by bolts 102 and nuts 104. Locking cap 106 is mounted on fire hydrant body 100 to close off a main outlet port defined in the fire hydrant body. Side caps 108a and 108b are mounted on fire hydrant body 100 to close off auxiliary side outlet ports defined in the fire hydrant body. As used herein, the terms "side cap" and "auxiliary cap" are used interchangeably to refer to the cap used to close off an auxiliary outlet port defined in the fire hydrant body, i.e., any outlet port other than the main outlet port. Plunger assemblies 110a and 110b are provided in internal channels formed in fire hydrant body 100 on opposite sides of the main outlet port defined in the fire hydrant body. When locking cap 106 is mounted on fire hydrant body 100, plunger assemblies 110a and 110b are actuated so that plungers extend into the recessed areas that surround the side outlet ports defined in fire hydrant body 100. The plungers interface with ratchet teeth formed on the back side of side caps 108a and 108b (see, for example, ratchet teeth 108b-4 of side cap 108b). As will be explained in more detail below, the ratchet teeth are configured to provide a one-way ratchet operation that allows side caps 108a and 108b to be threaded onto fire hydrant body 100, and also prevents the side caps from being removed from the fire hydrant body.

As shown in FIG. 1, fire hydrant body 100 includes flange 100a, neck 100b, and head 100c. Flange 100a has a plurality of holes formed therethrough and these holes are used to fasten the flange to a standpipe using bolts 102 and nuts 104. As shown in FIG. 1, flange 100a is a generally circular flange that extends from the lower portion of neck 100b; however, it will be apparent to those skilled in the art that the configuration of the flange may be varied to meet the needs of particular situations. Fire hydrant body 100, as well as the other components of the locking fire hydrant described below, may be made of any suitable material, e.g., stainless steel, iron, ductile iron, plastics, and composite materials.

Head 100c defines a hollow interior and has a generally rounded outer configuration that includes a number of recessed portions that are configured to protect components mounted thereon. In particular, head 100c includes main cap recess 100c-1, side cap recess 100c-2, and valve access channel 100c-3. Main cap recess 100c-1 surrounds cylinder 112, which has an inner surface and an outer surface. The inner surface of cylinder 112 defines a main outlet port of head 100c and the outer surface is threaded so that a complementarily threaded coupling member of a fire hose can be fastened thereon, as is well known to those skilled in the art.

Side cap recesses 100c-2 surround cylinders 114, each of which has an inner surface and an outer surface. The respective inner surfaces define auxiliary side outlet ports of head 100c and the respective outer surfaces are threaded so that either a complementarily threaded coupling member of a fire hose or a threaded side cap (e.g., side cap 108a) can be fastened thereon.

Valve access channel 100c-3 is formed in the upper portion of head 100c and is configured to receive tongue 106a that extends from cap body 106c of locking cap 106. The tongue 106a prevents access to valve control device 116 disposed within fire hydrant body 100 when the locking cap 106 is secured to the head 100c. Additional details regarding a fire hydrant body that is configured to protect a locking cap from being tampered with by unauthorized users are set forth in U.S. Pat. No. 6,688,326 B1, the disclosure of which is incorporated herein by reference for all purposes.

Opening tool 118 is used to remove locking cap 106 from fire hydrant body 100. As shown in FIG. 1, opening tool 118 includes main support portion 118a, a pair of handles 118b, housing 118c, and cam lever 118d. Cam lever 118d is used to operate opening tool 118 to remove locking cap 106 from fire hydrant body 100, as will be described in more detail below.

As shown in FIG. 1, wrench 120 includes socket wrench portion 120a and spanner portion 120b. Wrench 120 is shown inserted into the hollow handle portion of cam lever 118d to provide additional leverage to rotate the cam lever. The use of wrench 120 in this regard is optional, however, and opening tool 118 can be operated by rotating cam lever 118d by pulling on the handle portion thereof. Socket wrench portion 120a can be used to open and close valve control device 116 as well as to rotate side caps 108a and 108b, as will be described in more detail below.

Figure 2A:
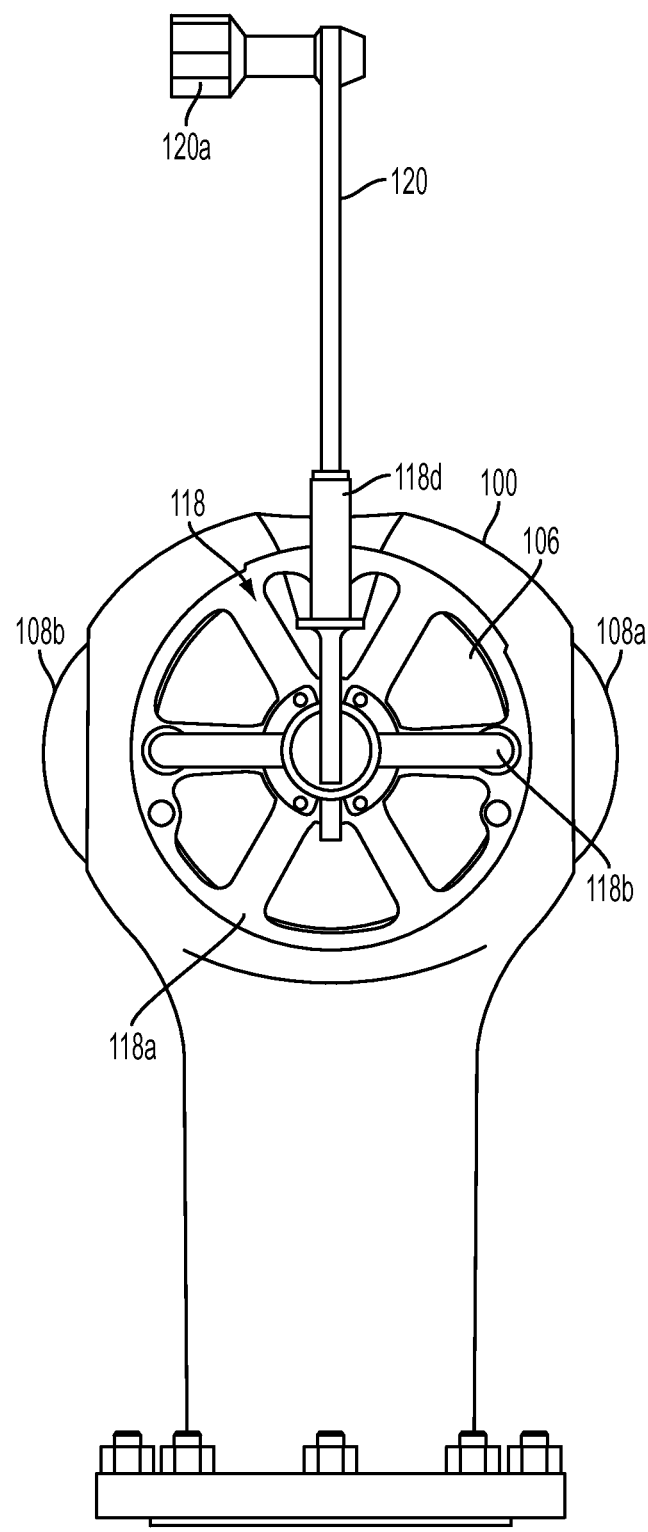
FIG. 2A is a front view of a locking fire hydrant with an opening tool positioned thereon, in accordance with one embodiment of the invention.

FIG. 2A is a front view of a locking fire hydrant with an opening tool 118 positioned thereon, in accordance with one embodiment of the invention. As shown in FIG. 2A, opening tool 118 is positioned on locking cap 106 (see FIG. 1) to facilitate removal of the locking cap, as will be described in more detail below. Side caps 108a and 108b are secured on the sides of fire hydrant body 100.

Figure 2B:
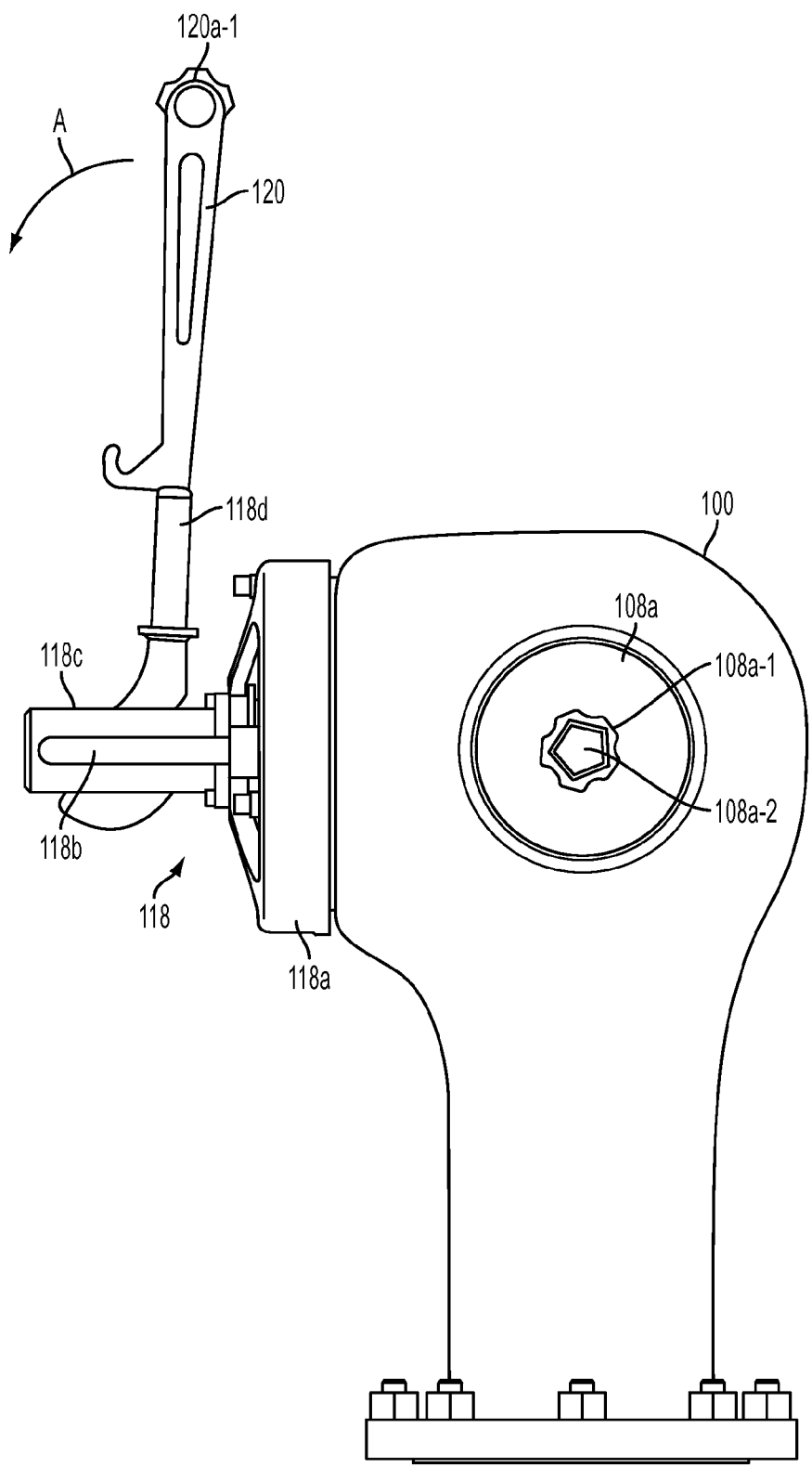
FIG. 2B is a side view of the locking fire hydrant shown in FIG. 2A, in accordance with one embodiment of the invention.

FIG. 2B is a side view of the locking fire hydrant shown in FIG. 2A, in accordance with one embodiment of the invention. As shown in FIG. 2B, opening tool 118 can be operated to remove locking cap 106 (see FIG. 1) from fire hydrant body 100 by pulling either cam lever 118d or wrench 120 in the direction indicated by arrow A. Side cap 108a has a socket 108a-1 formed therein. As shown in FIG. 2B, socket 108a-1 has an irregular shape, which is configured to mate with the irregularly-shaped external surface 120a-1 of socket wrench portion 120a of wrench 120. In this manner, socket wrench portion 120a of wrench 120 can be used to rotate side cap 108a. Pentagonal portion 108a-2 is provided in the center of socket 108a-1, as discussed in more detail below with reference to FIG. 9A.

Figure 3A:
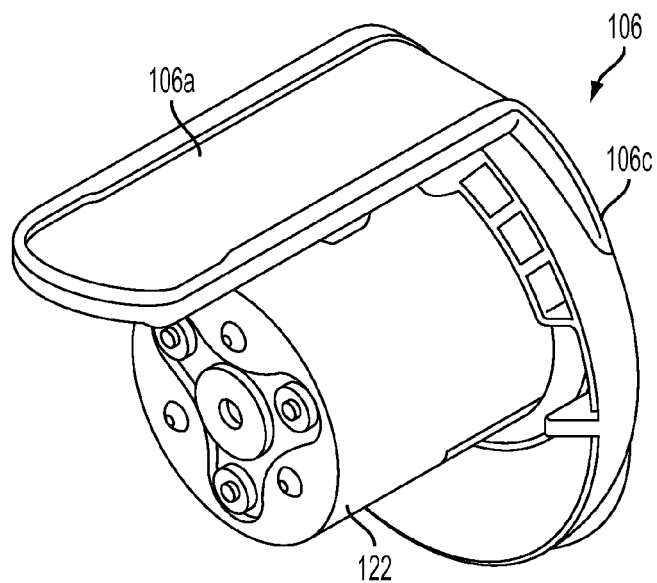
FIGS. 3A and 3B are respective aft and side views of a locking cap, in accordance with one embodiment of the invention.
Figure 3B:
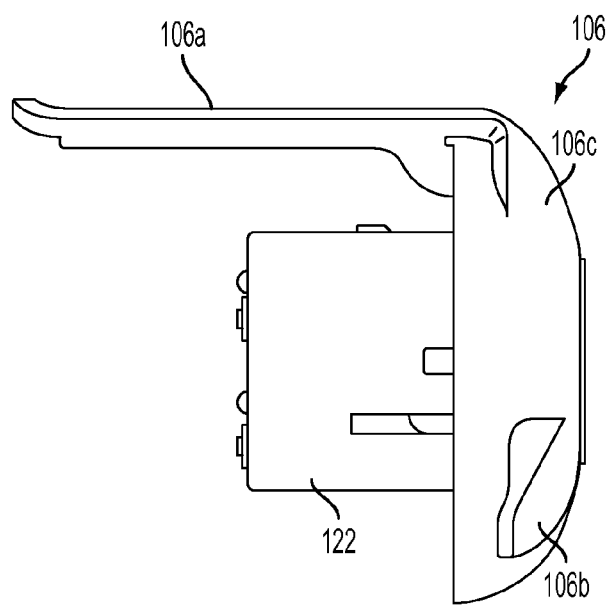

FIGS. 3A and 3B are respective aft and side views of a locking cap, in accordance with one embodiment of the invention. As shown in FIGS. 3A and 3B, the locking mechanism of locking cap 106 is surrounded by an optional lock cover 122, which has a generally cylindrical configuration. Lock cover 122 is provided to minimize the degree to which the locking mechanism is exposed to potentially harmful elements, e.g., dirt, foreign objects, etc. Lock cover 122 can be made from any suitable material. By way of example, lock cover 122 can be made of stainless steel or plastic.

Referring now to FIG. 3B, a number of protrusions 106b are provided on the outer surface of locking cap 106. Protrusions 106b serve as the attachment points for mounting opening tool 118 (see FIG. 1) on locking cap 106. In one embodiment, locking cap 106 is provided with three protrusions 106b, which are radially spaced around the outer surface of the locking cap. It will be apparent to those skilled in the art that the number and location of the protrusions can be varied to meet the needs of particular situations.

Figure 3C:
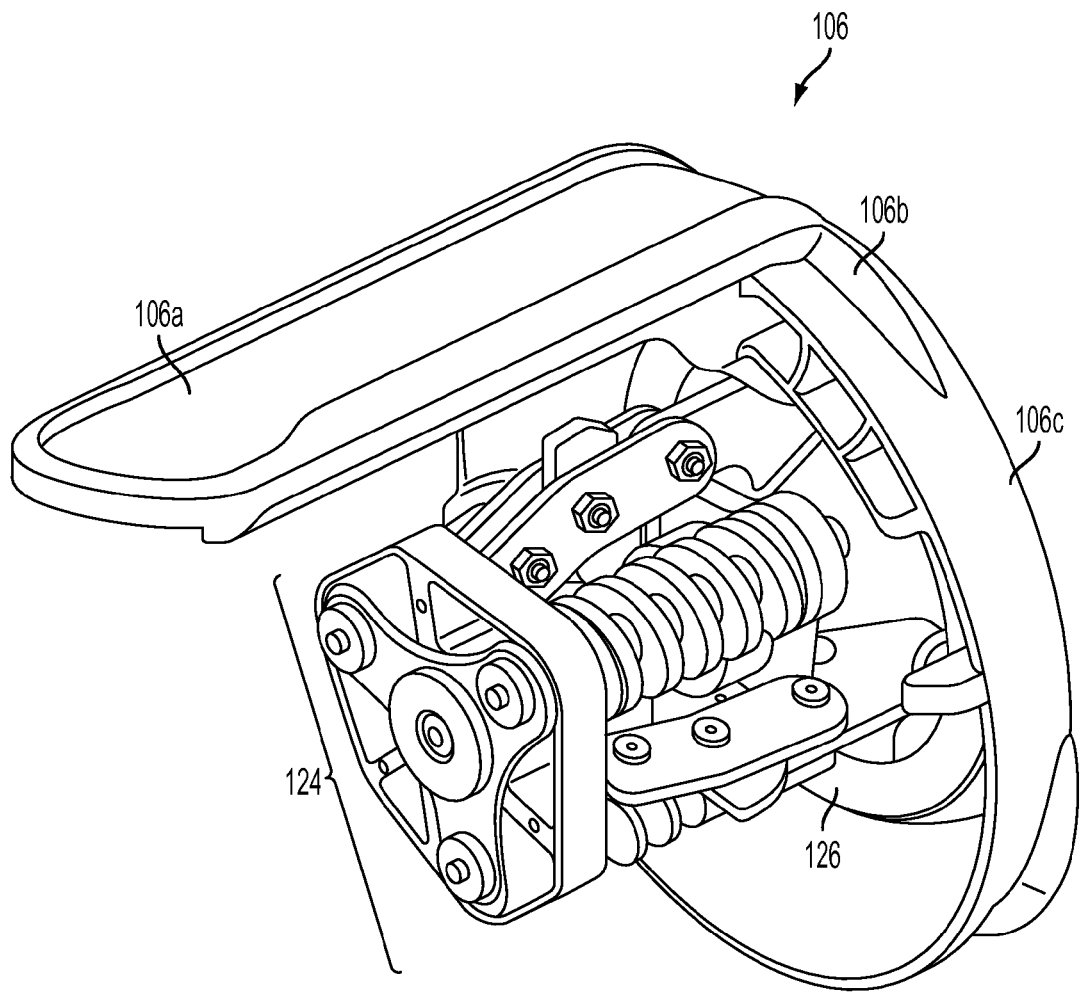
FIG. 3C is a view of the locking cap shown in FIG. 3A without lock cover 122, in accordance with one embodiment of the invention.

FIG. 3C is a view of the locking cap shown in FIG. 3A without lock cover 122, in accordance with one embodiment of the invention. As shown in FIG. 3C, with lock cover 122 removed, locking mechanism 124 provided on the inner surface of locking cap 106 is visible. Additional details regarding locking mechanism 124 are described below with reference to FIG. 3D. Gasket 126 is provided on the inner surface of locking cap 106 to provide a seal around the main outlet port when the locking cap is mounted on fire hydrant body 100 (see FIG. 1).

Figure 3D:
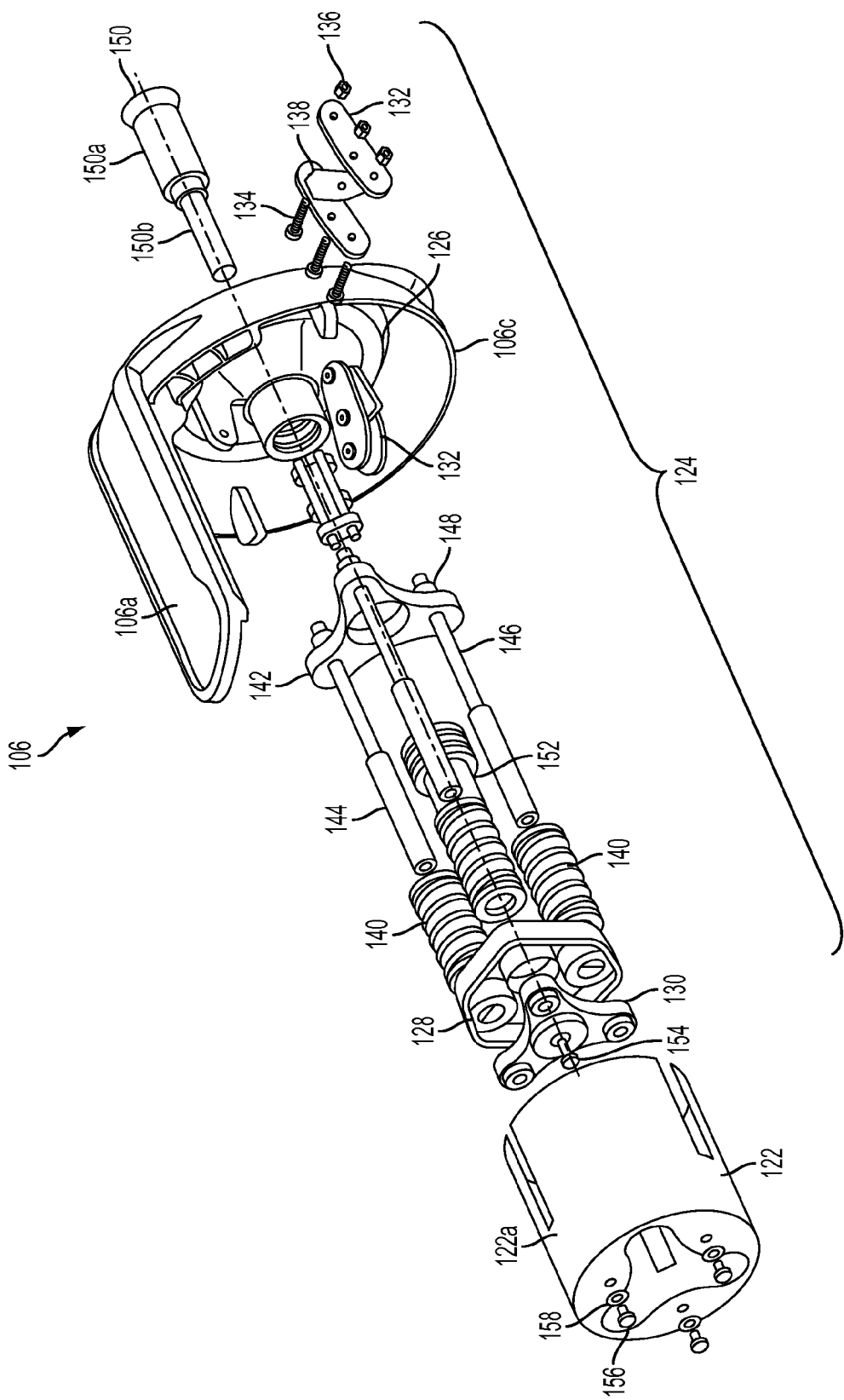
FIG. 3D is an exploded view of the components of locking mechanism 124 shown in FIG. 3C, in accordance with one embodiment of the invention.

FIG. 3D is an exploded view of the components of locking mechanism 124 shown in FIG. 3C, in accordance with one embodiment of the invention. As shown in FIG. 3D, locking mechanism 124 includes top plate 128, which has a central hole and three peripheral holes formed therethrough. The outer surface of top plate 128 is configured to receive spring support 130, and the inner surface of the top plate is provided with three mounting anchors. Three pairs of support arms 132 connect top plate 128 to the inner surface of locking cap 106. Each support arm 132 has three holes formed therethrough. One end of each support arm 132 is fastened to one of the mounting anchors on the inner surface of top plate, and the opposite end of each support arm is fastened to one of mounting anchors 106c provided on the inner surface of locking cap 106. As shown in FIG. 3D, support arms 132 are fastened using bolts 134 and hex nuts 136; however, it will be apparent to those skilled in the art that other suitable fasteners can be used. A cam gear 138 is rotatably fastened between each pair of support arms 132. Each cam gear 138 has a cam surface at one end thereof and a set of gear teeth at the opposite end thereof.

With continuing reference to FIG. 3D, three springs 140 are disposed between top plate 128 and cap plate 142, which has a central hole formed therethrough. In one embodiment, springs 140 are heavy duty die springs (at least about 2,500 pounds total spring pressure); however, it will be apparent to those skilled in the art that any suitable springs can be used. Each spring 140 is disposed on a spring shaft 144, which has a hollow interior that receives a socket head cap screw 146. Each socket head cap screw 146 is threaded into spring support 130. Washers 148 are disposed between the socket head cap of each socket head cap screw 146 and the outer surface of cap plate 142.

Still referring to FIG. 3D, actuator pin 150 extends through a central aperture defined in locking cap 106. Actuator pin 150 includes head portion 150a, which has a mushroom-shaped configuration, and extension portion 150b. Rack 152, which has a generally cylindrical configuration and a hollow interior, receives extension portion 150b of actuator pin 150. Cap screw 154, which extends through a central hole in spring support 130, is threaded into the end of extension portion 150b of actuator pin 150. The outer surface of rack 152 is provided with a number of cylindrical gears, which are configured to mate with the gear teeth provided at one end of each of cam gears 138.

As shown in FIG. 3D, lock cover 122 is fastened to top plate 128 using screws 156 and washers 158; however, it will be apparent to those skilled in the art that other suitable fasteners also can be used. To enable locking mechanism 124 to operate when lock cover 122 is in place, slots 122a are provided in the locking cover. Each slot 122a is located so that the cam surface of a cam gear 138 can extend therethrough and interface with a mating surface inside the fire hydrant body to lock and unlock locking mechanism 124, as will be explained in more detail below.

FIG. 4A is a front view of a locking mechanism, in accordance with one embodiment of the invention. As shown in FIG. 4A, locking mechanism 124 is oriented so that the three cam gears 138 are positioned at the 12 o'clock, 4 o'clock, and 8 o'clock positions on a standard clock face. This uniform radial spacing of the three cam gears 138 about locking mechanism 124 provides the locking mechanism with a self-centering capability when the locking mechanism is disposed within a fire hydrant body. If desired, the relative positions of the three cam gears 138 can be varied from that shown in FIG. 4A so that the three cam gears are non-uniformly radially spaced about locking mechanism 124. With this non-uniform configuration, locking mechanism 124 will still function properly, but will not have the self-centering capability because the three cam gears 138 are not uniformly radially spaced about the locking mechanism.

FIG. 4B is a cross-sectional view of the locking mechanism taken across section 4B-4B shown in FIG. 4A, in accordance with one embodiment of the invention. As shown in FIG. 4B, gear teeth 138a of cam gear 138 are intermeshed with the rack 152. The rack 152 can include cylindrical gears 152a. As such, when actuator pin 150 and rack 152 are caused to move inwardly (to the left in FIG. 4B), the interaction between cylindrical gears 152a and gear teeth 138a will in turn cause cam gear 138 to rotate so that cam surface 138b assumes an unlock position that allows the locking cap to be removed from the fire hydrant body, as will be explained in more detail below.

Figure 5A:
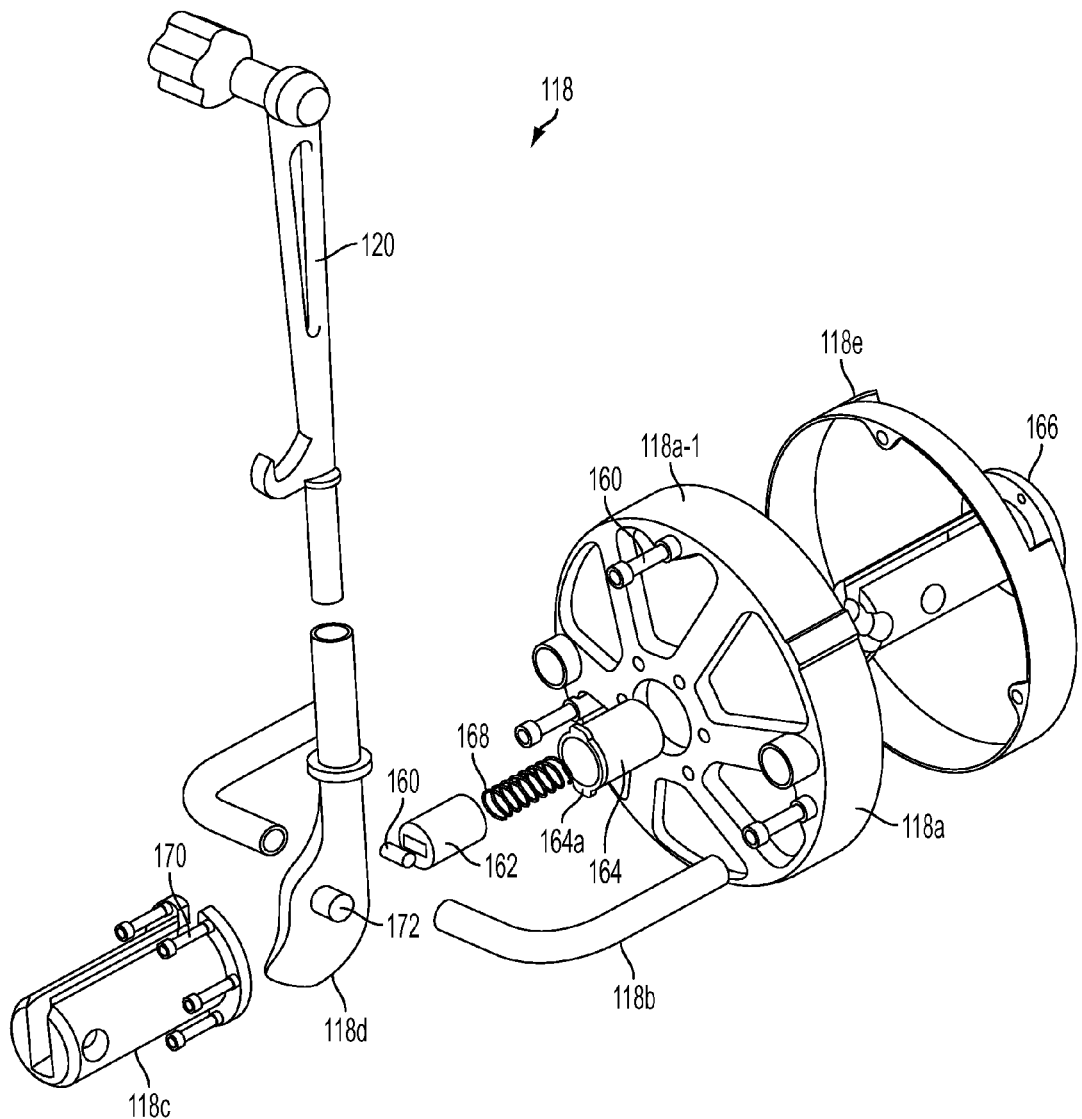
FIG. 5A is an exploded view of the components of the opening tool, in accordance with one embodiment of the invention.

FIG. 5A is an exploded view of the components of the opening tool, in accordance with one embodiment of the invention. As shown in FIG. 5A, opening tool 118 includes main support portion 118a, a pair of handles 118b, housing 118c, cam lever 118d, and collar 118e. Main support portion 118a includes annular portion 118a-1, a number of support arms 118a-2, and hub 118a-3. Collar 118e is fastened to annular portion 118a-1 of main support portion 118a with screws 160. Roller 160 is disposed within a recess formed in an outer surface of inner pin 162.

In one embodiment, roller 160 is a roller bearing, which minimizes the friction between cam lever 118d and inner pin 162 when the cam lever is rotated. A pin, which is composed of inner pin 162 and outer pin 164, is disposed within guide 166, which is configured to be received within housing 118c. Outer pin 164 is provided with tabs 164a, which act as retaining members to keep the outer pin disposed within guide 166. Tabs 164a also act to minimize rotation of outer pin 164 when cam lever 118d is rotated. Spring 168 is disposed between inner pin 160 and outer pin 162. Housing 118c is fastened to guide 166 with screws 170, which extend through holes in hub 118a-3 of main support portion 118a. Cam lever 118d is rotatably disposed on shaft 172, which is supported within an opening in guide 166 that serves as a shaft support. The structural components of opening tool 118 can be made from any suitable material. By way of example, the structural components of opening tool 118 can be made from aluminum, steel, brass, bronze, cast iron, composite materials, and combinations thereof.

Figure 5B:
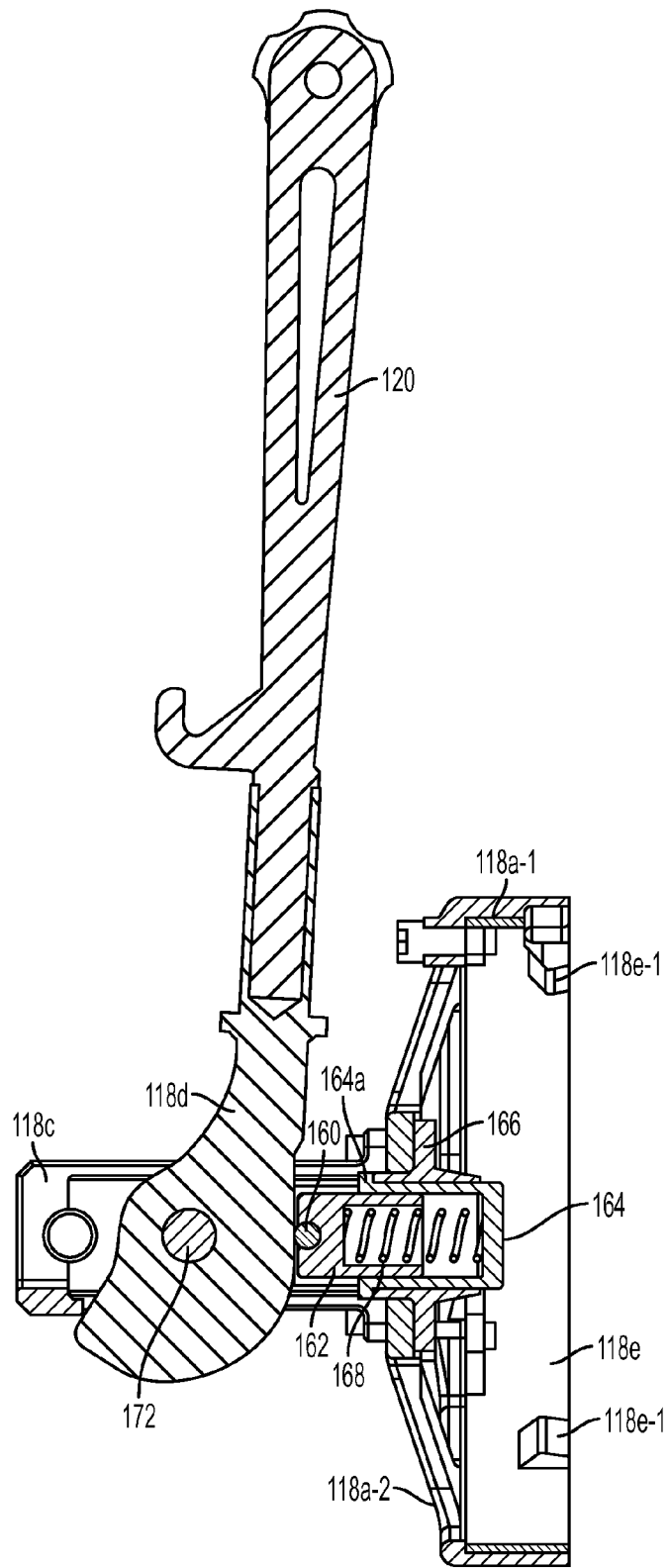
FIG. 5B is a cross-sectional view of the opening tool before it is positioned on a locking cap, in accordance with one embodiment of the invention.

FIG. 5B is a cross-sectional view of the opening tool before it is positioned on a locking cap, in accordance with one embodiment of the invention. As shown in FIG. 5B, wrench 120 is disposed in the hollow handle portion of cam lever 118d to provide additional leverage for rotating the cam lever, as discussed above. The spring force exerted by spring 168 keeps outer pin 164 separated from inner pin 162, and causes the inner pin to exert a force on cam lever 118d that keeps the cam lever in an upright position, as shown in FIG. 5B.

Collar 118e is provided with a number of protrusions 118e-1, which are configured to attach to the protrusions provided on the outer surface of the locking cap (see, for example, protrusions 106b in FIG. 1). When opening tool 118 is positioned on a locking cap with protrusions 118e-1 attached to corresponding protrusions provided on the locking cap, outer pin 164 will be displaced so that the inner surface thereof is in contact with the outer edge of inner pin 162 (see, for example, FIG. 6A). As such, rotation of cam lever 118d will cause the inner pin 162 and outer pin 164 to move in unison (compare the positions of inner pin 162 and outer pin 164 shown in FIGS. 6A and 6B).

As described herein, opening tool 118 is positioned on a locking cap by attaching protrusions 118e-1 to corresponding protrusions provided on the outer surface of the locking cap (see, for example, protrusions 106b shown in FIG. 3B). It will be apparent to those skilled in the art that other techniques can be used to attach the opening tool to the locking cap. By way of example, the protrusions provided on the outer surface of the locking cap could be replaced by suitably shaped recesses formed in the outer surface of the locking cap. With this configuration, the opening tool would be positioned on the locking cap by disposing protrusions 118e-1 within the recesses formed in the outer surface of the locking cap.

Figure 6A:
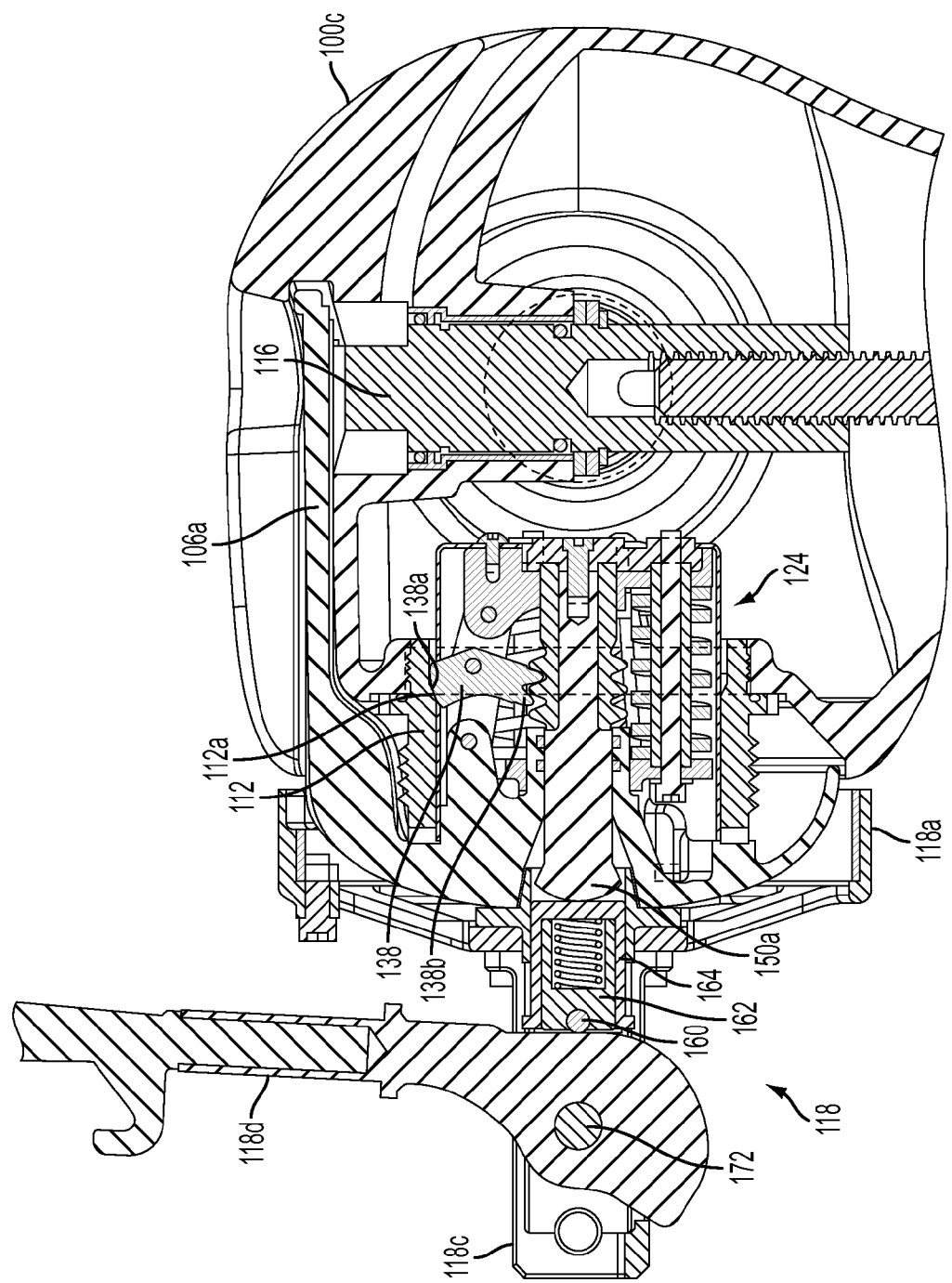
FIGS. 6A and 6B are cross-sectional views that illustrate the removal of the locking cap from the fire hydrant body, in accordance with one embodiment of the invention.
Figure 6B:
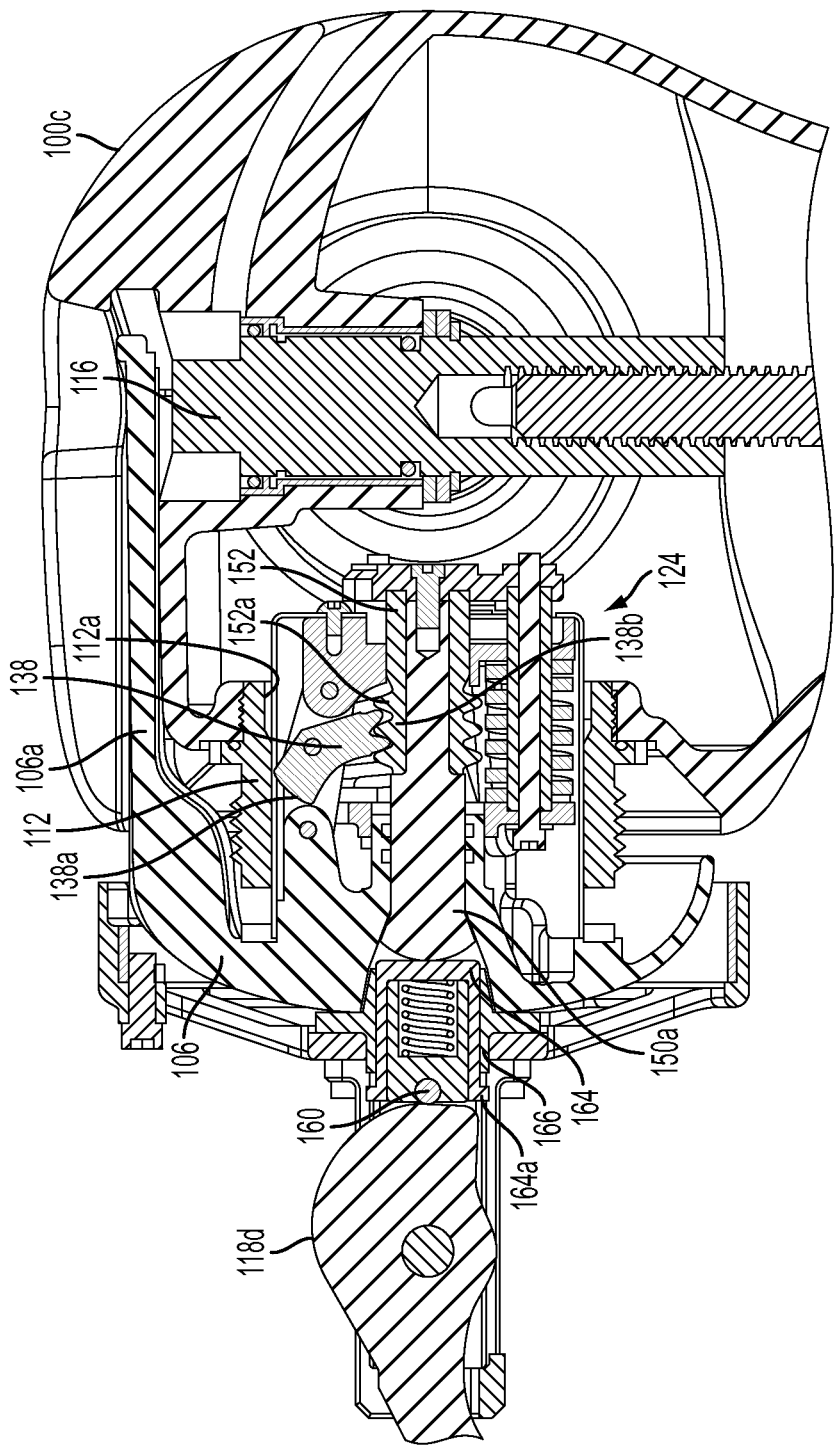

FIGS. 6A and 6B are cross-sectional views that illustrate the removal of the locking cap from the fire hydrant body, in accordance with one embodiment of the invention. As shown in FIG. 6A, locking cap 106 is mounted on head 100c of fire hydrant body 100 with locking mechanism 124 in the locked position. In the locked position, cam surface 138a of each cam gear 138 is engaged with an inner surface of head 100c to prevent locking cap 106 from being removed therefrom. As shown in FIG. 6A, cam surface 138a is engaged with inner surface 112a of cylinder 112. Opening tool 118 is positioned on locking cap 106 to facilitate removal of the locking cap from head 100c. As shown in FIG. 6A, the outer surface of outer pin 164 has been pressed against the outer surface of mushroom head 150a of actuator pin 150 during the process of positioning opening tool 118 on locking cap 106. As a result, outer pin 164 is displaced so that the inner surface thereof is in contact with the outer edge of inner pin 162. As shown in FIG. 6A, cam lever 118d is in the upright position.

FIG. 6B shows the locking cap being removed from the fire hydrant body with the locking mechanism in the unlocked position. As shown in FIG. 6B, cam lever 118d has been about rotated relative to the upright position of the cam lever shown in FIG. 6A. This rotation of cam lever 118d causes the cam surface of the cam lever to push against inner pin 162 (through roller 160) and outer pin 164 so that the inner pin and the outer pin move in unison. The cam surface includes a first flat surface, which contacts inner pin 162 (through roller 160) when cam lever 118d is in the upright position (see FIG. 6A), and a second flat surface, which contacts the inner pin (through the roller) when the cam lever is in the rotated position (see FIG. 6B). A curved surface extends between the first and second flat surfaces.

Still referring to FIG. 6B, the displacement of outer pin 164 in turn causes actuator pin 150 to be pushed into the double-coned opening of locking cap 106, i.e., toward the interior of the fire hydrant body. As actuator pin 150 moves toward the interior of the fire hydrant body, rack 152, which is coupled to the actuator pin, also moves toward the interior of the fire hydrant body. During this movement, cylindrical gears 152a of rack 152 interact with gear teeth 138a of cam gears 138 and cause the cam gears to rotate. As shown in FIG. 6B, cam gear 138 has rotated (relative to the position shown in FIG. 6A) to the unlocking position so that cam surface 138a is no longer in contact with inner surface 112a of cylinder 112. Once cam surfaces 138a of cam gears 138 have cleared the inner surface 112a of cylinder 112, locking cap 106 can be removed from head 100c of fire hydrant body 100.

Figure 7:
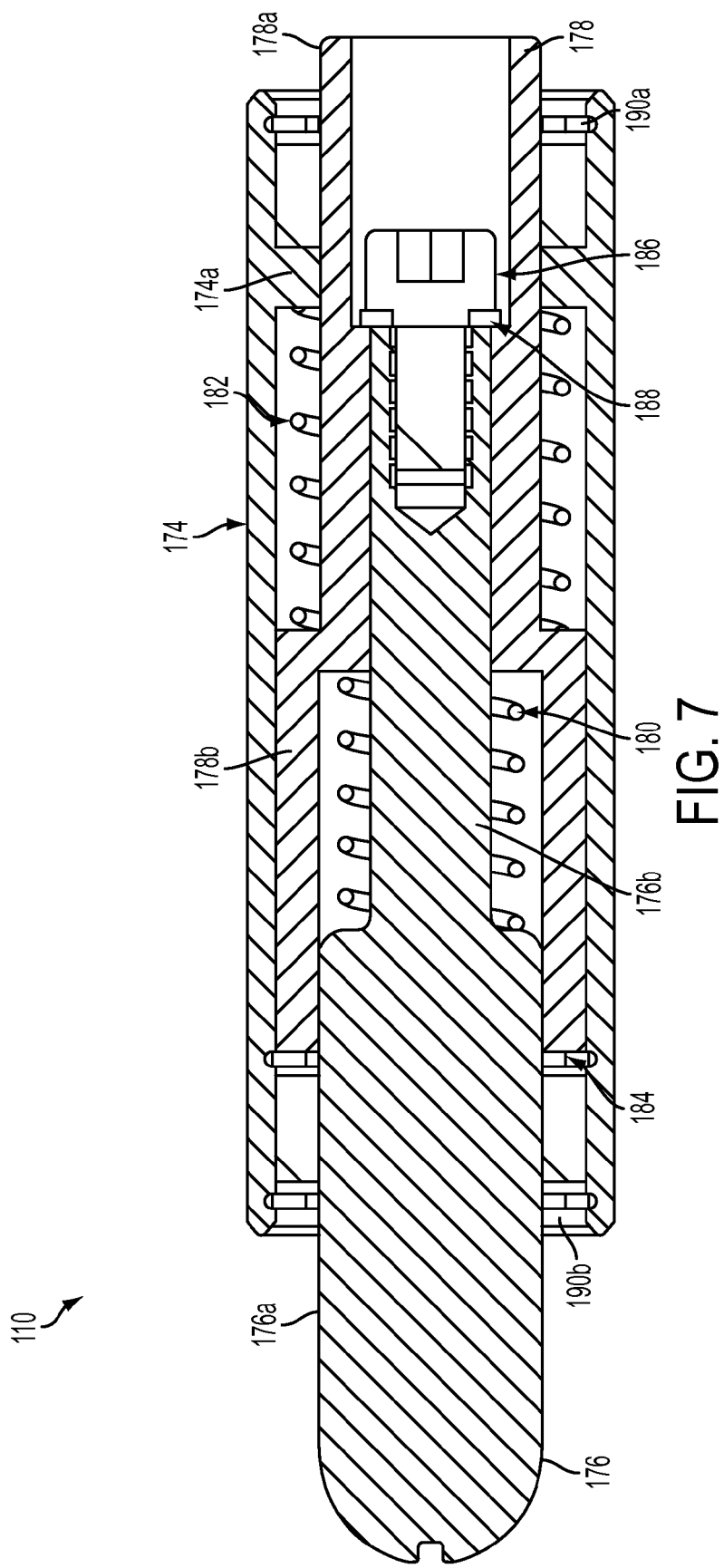
FIG. 7 is a cross-sectional view of a plunger assembly, in accordance with one embodiment of the invention.

FIG. 7 is a cross-sectional view of a plunger assembly, in accordance with one embodiment of the invention. As shown in FIG. 7, plunger assembly 110 includes sleeve 174 in which front plunger 176 and side plunger 178 are disposed. Front plunger 176 is referred to as a "front" plunger because this plunger is configured to extend into the recess surrounding the main outlet port at the front of the fire hydrant body. Side plunger 178 is referred to as a "side" plunger because this plunger is configured to extend into the recess proximate to an auxiliary outlet port on the side of the fire hydrant body.

Front plunger 176 has a stepped configuration that defines wide portion 176a and narrow portion 176b. The end of wide portion 176a that protrudes from sleeve 174 has a generally rounded configuration.

Side plunger 178 has a cylindrical configuration, which is stepped to define narrow portion 178a and wide portion 178b, with the narrow portion protruding from sleeve 174. Within sleeve 174, plungers 176 and 178 are arranged such that front plunger 176 is received within side plunger 178. Spring 180 is disposed within side plunger 178 such that this spring is in contact with the step defined in front plunger 176 and the step defined in the inner surface of side plunger 178. Spring 182 is disposed within sleeve 174 such that this spring is in contact with the step defined in the outer surface of side plunger 178 and internal protrusion 174a provided in the sleeve. Retaining ring 184 provided within sleeve 174 acts as a stop for side plunger 178. To keep front plunger 176 from being pulled out of sleeve 174, screw 186 and washer 188 are fastened to the end of this plunger which is disposed within the sleeve. Seals 190a and 190b are provided at the ends of sleeve 174 to keep dirt and other debris from entering the sleeve. In one embodiment, seals 190a and 190b are felt seals; however, any suitable seal may be used.

Figure 8A:
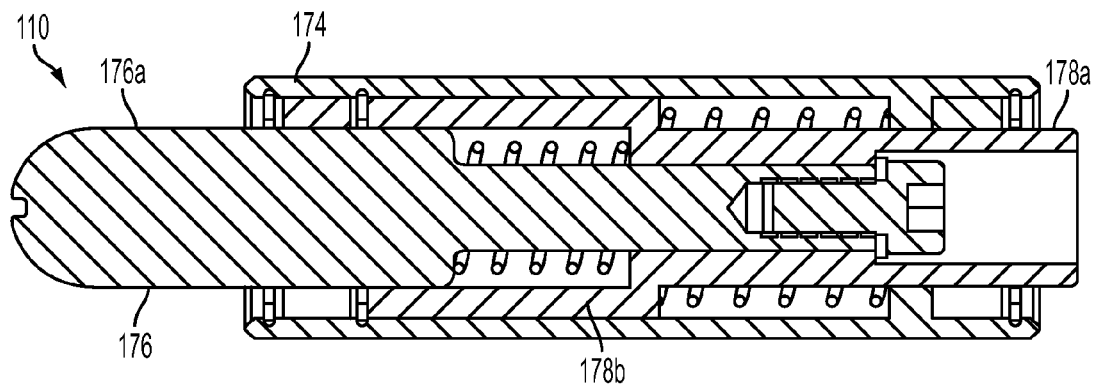
FIGS. 8A-8C illustrate the manner in which the plunger assemblies operate when the locking cap is mounted on the fire hydrant body, and when a side cap is mounted to the fire hydrant body, in accordance with one embodiment of the invention.
Figure 8B:
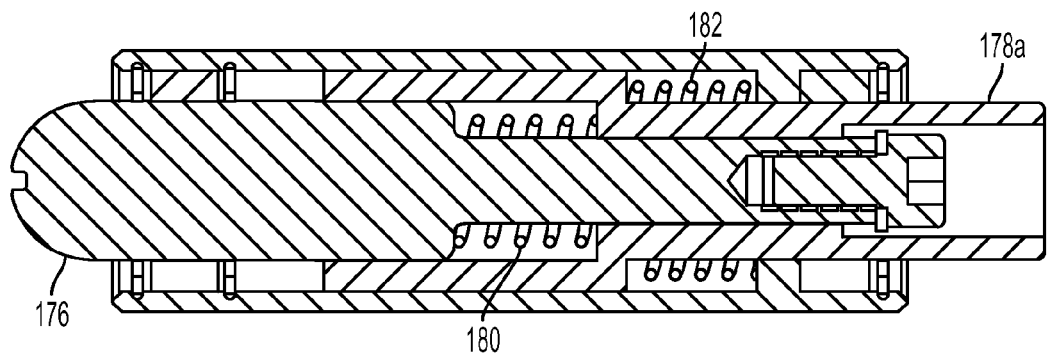
Figure 8C:
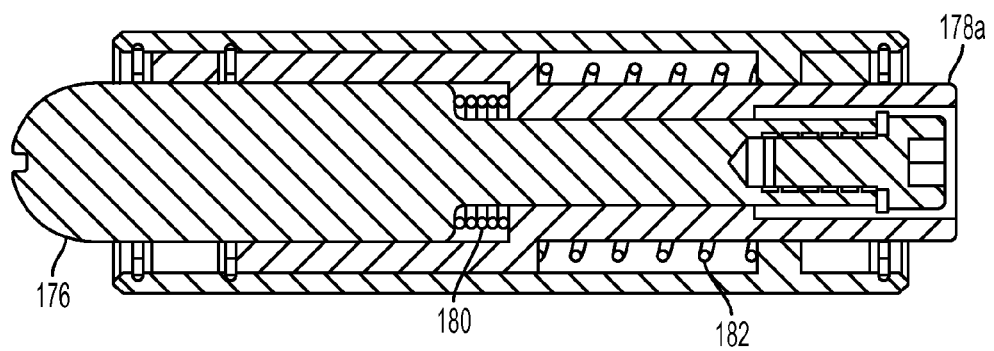

FIGS. 8A-8C illustrate the manner in which the plunger assemblies operate when the locking cap is mounted on the fire hydrant body, and when a side cap is mounted to the fire hydrant body, in accordance with one embodiment of the invention. FIG. 8A shows plunger assembly 110 in the pre-loaded condition, which occurs when the locking cap is not mounted on the fire hydrant body (the state of plunger assembly 110 shown in FIG. 8A is the same as that shown in FIG. 7).

As shown in FIG. 8A, front plunger 176 is in a first position in which a relatively large amount of wide portion 176a extends beyond one end of sleeve 174, and side plunger 178 is in a first position in which only a relatively small amount of narrow portion 178a extends beyond the other end of the sleeve. With side plunger 178 in the first position, the second plunger is not engaged in a side cap and the side cap can be removed from the fire hydrant body without any interference from this plunger.

FIG. 8B shows plunger assembly 110 where the locking cap is mounted on the fire hydrant body. As shown in FIG. 8B, front plunger 176 is in a second (or actuated) position in which only a relatively small amount of wide portion 176a extends beyond the end of sleeve 174 due to the force applied by the locking cap 106. As the locking cap 106 contacts front plunger 176, this plunger is pushed into plunger assembly 110 (i.e., the front plunger moves to the right in FIG. 8B). This movement of front plunger 176 compresses springs 180 and 182 in series, and the compression of the two springs causes side plunger 178 to move into the second, actuated position in which a relatively large amount of narrow portion 178a extends beyond the other end of sleeve 174 (i.e., the side plunger also moves to the right in FIG. 8B). With side plunger 178 in the second position, a side cap cannot be removed from the fire hydrant body because this plunger interferes with the rotation of the side cap, as will be explained in more detail below. It should be understood that the side cap can be mounted with the side plunger 178 in the second position, as will be explained in more detail below.

FIG. 8C illustrates the ratcheting movement of the side plunger that occurs as a side cap is being mounted onto the fire hydrant body where the locking cap 106 is mounted on the fire hydrant body and the side plunger 178 is in the second position. As a side cap is being mounted (e.g., rotated or otherwise mounted on the side outlet port 100c-2) to secure the side cap to the fire hydrant body, the ratchet teeth provided on the back of the side cap engage the narrow portion 178a of side plunger 178. Each time one of the ratchet teeth comes into contact with side plunger 178, the side plunger is compressed into plunger assembly 110 (i.e., the side plunger moves to the left in FIG. 8C). This movement of side plunger 178 causes spring 180 to compress and spring 182 to expand, and results in the side plunger moving from the second position (see FIG. 8B) into a third position, as shown in FIG. 8C. In a case where side plunger 178 is in the third position, the amount of narrow portion 178a that extends beyond the end of sleeve 174 is slightly larger than the amount shown in FIG. 8A, where the side plunger is in the first position. The ratcheting movement of side plunger 178 between the second position shown in FIG. 8B and the third position shown in FIG. 8C enables a side cap to fastened onto the fire hydrant body, as will explained in more detail below.

Figure 9A:
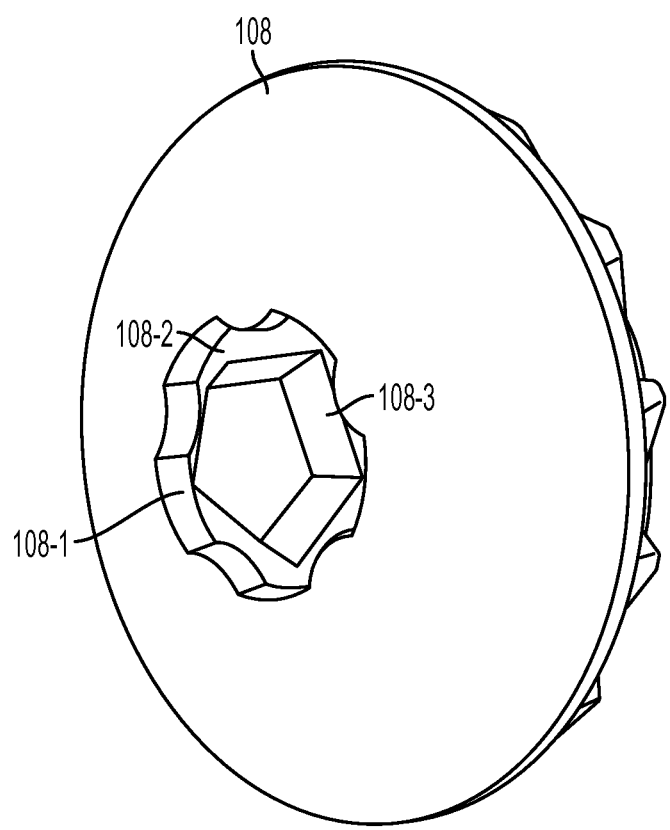
FIGS. 9A and 9B are respective front and back views of a side cap, in accordance with one embodiment.
Figure 9B:
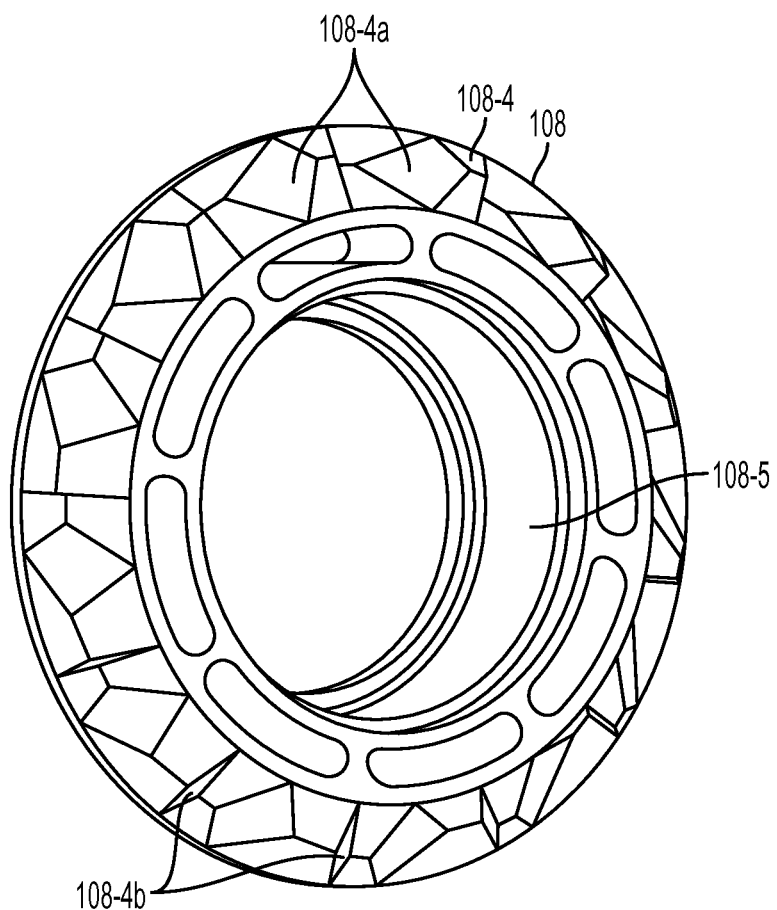

FIGS. 9A and 9B are respective front and back views of a side cap, in accordance with one embodiment. As shown in FIG. 9A, side cap 108 has a socket 108-1 formed therein, with the socket having an irregular shape. The irregular shape of socket 108-1 is configured to mate with the irregularly-shaped external surface 120a-1 of socket wrench portion 120a of wrench 120 (see, e.g., FIGS. 2A and 2B). In this manner, socket wrench portion 120a of wrench 120 can be used to rotate side cap 108. Pentagonal portion 108a-2 is provided in the center of socket 108a-1 to create the appearance that the side cap can be opened with a pentagonal tool used in connection with some existing fire hydrants; however, the pentagonal portion is provided with slanted surfaces so that the pentagonal tool cannot be fitted thereon. To ensure that socket wrench portion 120a can be inserted into socket 108a-1, the size of pentagonal portion 108a-2 is made smaller than the size of the interior of the socket wrench portion, which is used to open and control valve control device 116 (see FIG. 1). Pentagonal portion 108a-2 also serves to prevent tools and other objects that might be inserted into socket 108a-1 from being positioned such that they contact opposing sides of the socket. It should be understood that the shape of pentagonal portion 108a-2 is exemplary and that this portion can have any suitable shape. As shown in FIG. 9B, the interior of side cap 108 is provided with threads 108-5 to enable the side cap to be threaded onto an auxiliary side outlet port of the fire hydrant body.

With continuing reference to FIG. 9B, ratchet teeth 108-4 are provided around the periphery of the back side of side cap 108. Each of the ratchet teeth 108-4 has a leading face 108-4a and a trailing face 108-4b. Each leading face 108-4a is configured to enable the ratcheting movement of the side plunger described above (see FIG. 8C) when side cap 108 is being fastened to the fire hydrant body. In one embodiment, each leading face 108-4a defines a ramped surface having a compound angle including an axial component and a radial component (relative to the axis of the side cap). Each trailing face 108-4b is configured to prevent any ratcheting movement of the side plunger when an attempt to remove side cap 108 is made while the locking cap is fastened to the fire hydrant body. In one embodiment, each trailing face 108-4b defines a surface that is substantially parallel to the axis of the side cap, i.e., there is no angle relative to the axis of the side cap. With this configuration, the trailing face does not trigger any ratcheting movement of the side plunger and is thereby blocked by the side plunger when side cap 108 is rotated in a counterclockwise direction. Consequently, side cap 108 cannot be removed while the locking cap is fastened to the fire hydrant body and the side plunger 178 is in the second (i.e., actuated) position.

Figure 10A:
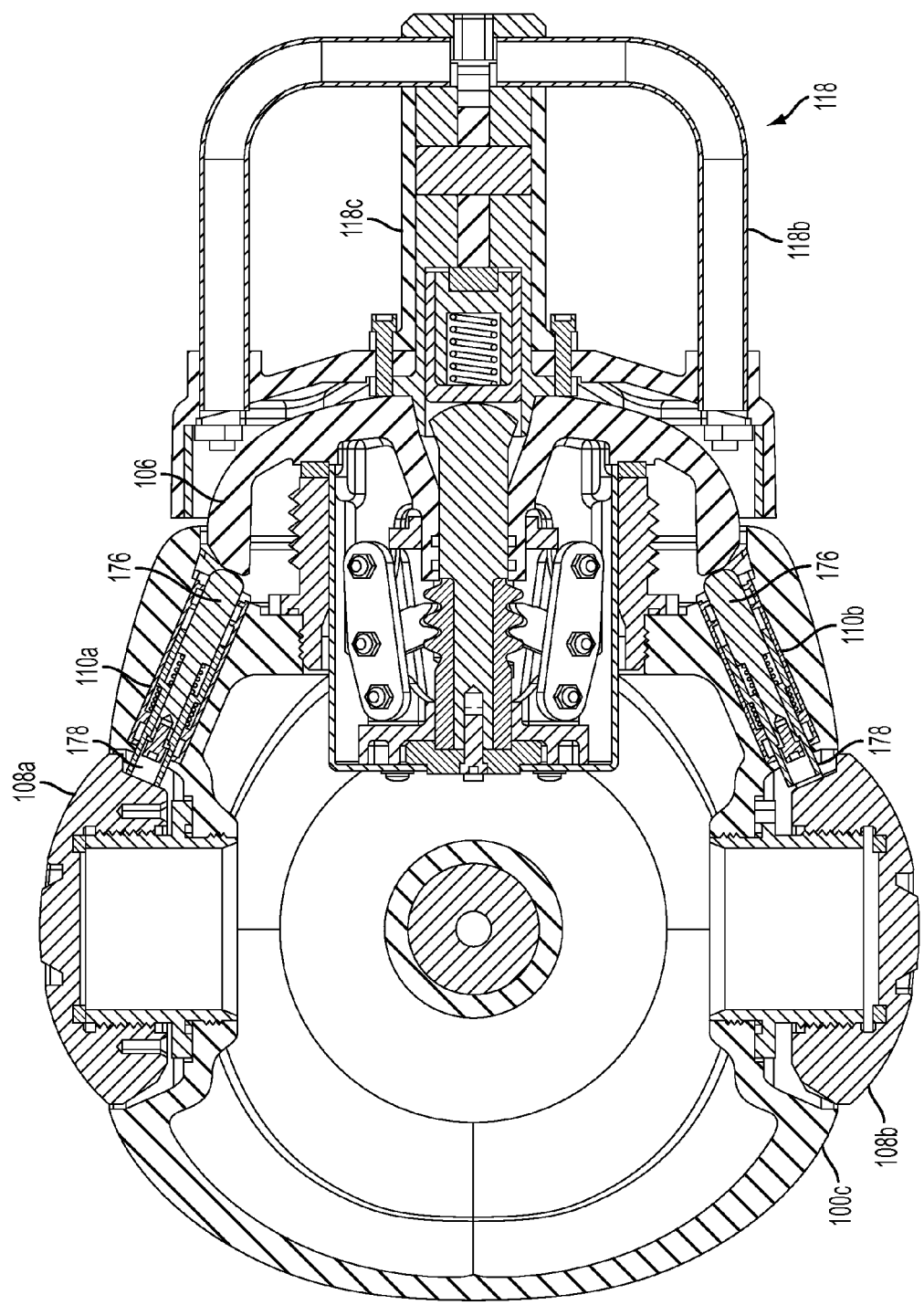
FIGS. 10A and 10B are cross-sectional views that show a locking fire hydrant with the locking cap locked (FIG. 10A) and unlocked (FIG. 10B), in accordance with one embodiment of the invention.
Figure 10B:
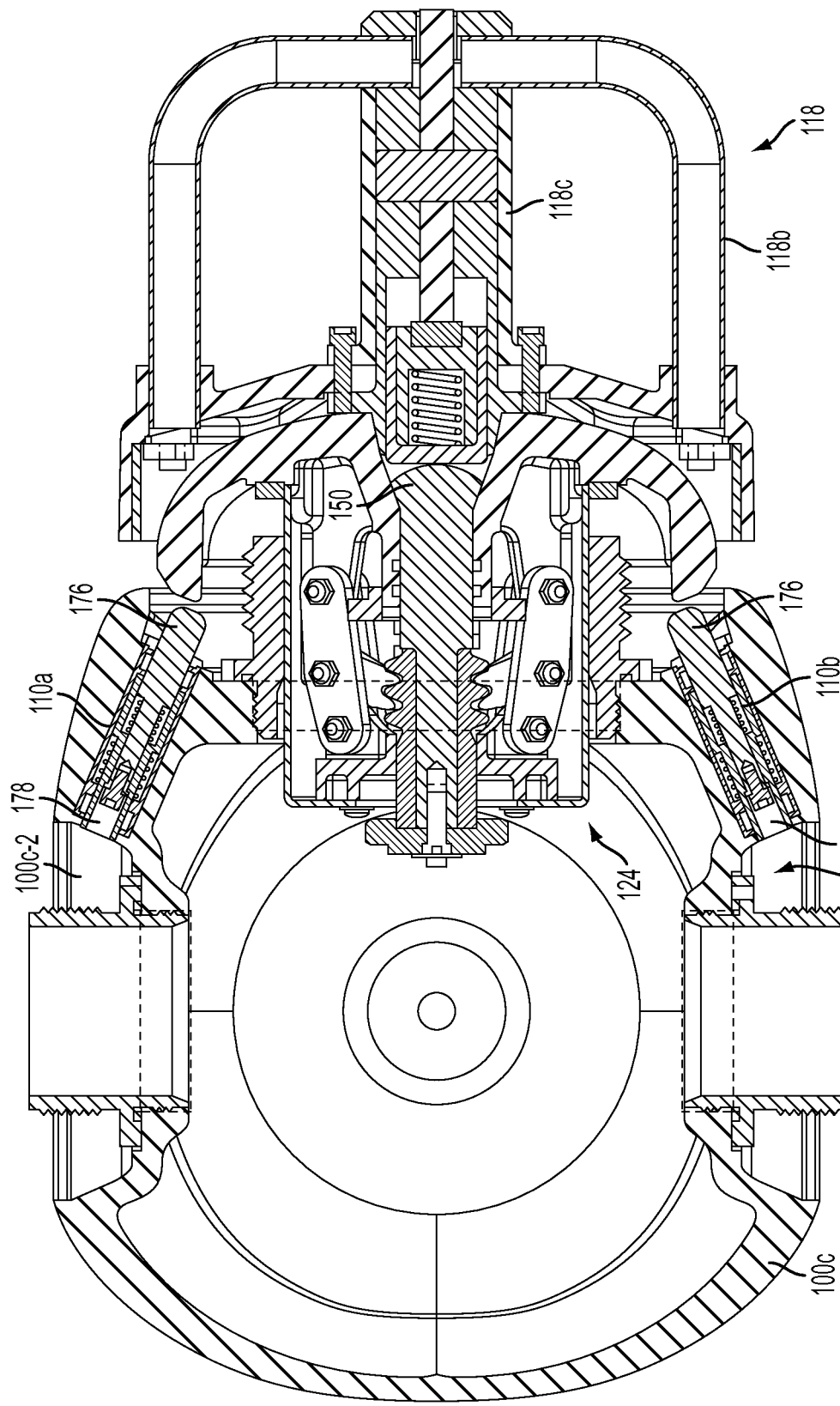

FIGS. 10A and 10B are cross-sectional views that show a locking fire hydrant with the locking cap locked (FIG. 10A) and unlocked (FIG. 10B), in accordance with one embodiment of the invention. As shown in FIG. 10A, locking cap 106 is locked to head 100c of fire hydrant body 100 and opening tool 118 has been mounted on the locking cap in preparation for removing the locking cap from the fire hydrant body. Plunger assemblies 110a and 110b are provided in internal channels formed in head 100c of fire hydrant body 100. Plunger assemblies 110a and 110b can be secured within the internal channels using any suitable technique. In one embodiment, bolt-on shoulders are provided at each end of the internal channels to secure plunger assemblies 110a and 110b within each of the internal channels. The force applied by locking cap 106 on front plungers 176 has pushed the front plungers into respective plunger assemblies 110a and 110b, as shown in FIG. 10A, and this movement has caused side plungers 178 to move into an actuated position (i.e., the second position shown in FIG. 8B). With side plungers 178 in this actuated position, side caps 108a and 108b cannot be removed from head 100c because the side plungers prevent the side caps from being rotated in a counterclockwise direction, as described herein.

The locking cap 106 actuates the plunger assembly 110 in the internal channel in the fire hydrant body 100 to secure a side cap to a corresponding auxiliary outlet port of the fire hydrant. The plunger assembly 110 acts as an internal latching mechanism for latching or securing the side cap. It should be understood that other forms of internal latching mechanisms can also be used to secure one or more auxiliary caps to the fire hydrant.

As shown in FIG. 10B, opening tool 118 has been used to remove locking cap 106 from head 100c of fire hydrant body 100 (note that the opening tool has pushed actuator pin 150 into the opening in locking cap 106 thereby causing locking mechanism 124 to move into the unlocked position). With locking cap 106 removed from head 100c, front plungers 176 of plunger assemblies 110a and 110b assume the preloaded condition in which the front plungers are in an extended position (the first position shown in FIG. 8A). This movement of front plungers 176 causes side plungers 178 to assume the preloaded condition in which the side plungers are in a retracted position (the first position shown in FIG. 8A). With side plungers 178 in this retracted position, side caps 108a and 108b (see FIG. 10A) can be removed from head 100c by rotating the side caps in a counterclockwise direction. As shown in FIG. 10B, side cap recesses 100c-2 are visible because the side caps have been removed from head 100c of fire hydrant body 100.

Figure 11:
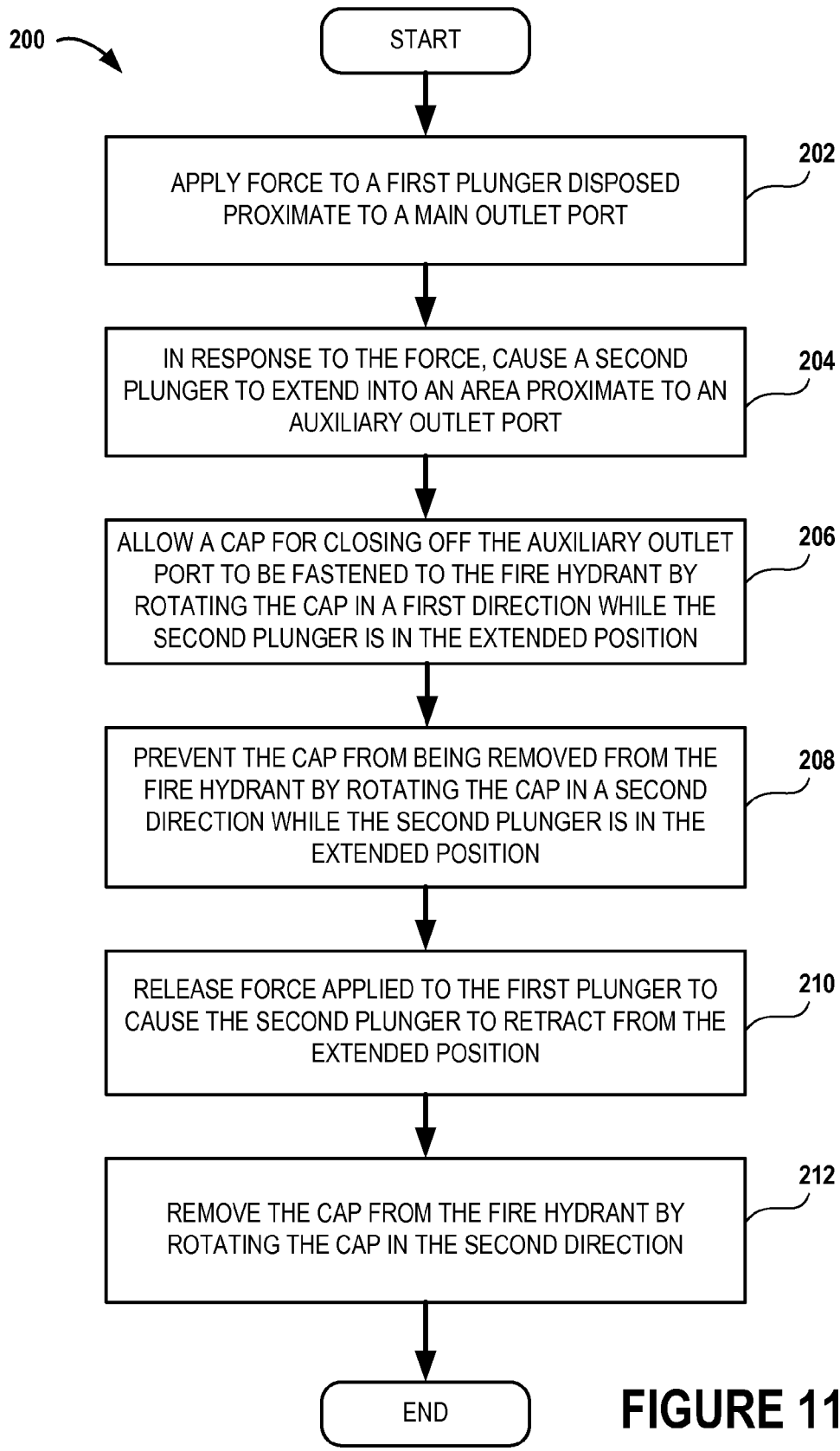
FIG. 11 is a flow chart diagram illustrating the method operations performed in fastening an auxiliary cap for closing off an auxiliary outlet port to a fire hydrant, in accordance with one embodiment of the invention.

FIG. 11 is a flow chart diagram 200 illustrating the method operations performed in fastening an auxiliary cap for closing off an auxiliary outlet port to a fire hydrant, in accordance with one embodiment of the invention. The method begins in operation 202 in which force is applied to a first plunger disposed proximate to a main outlet port of a fire hydrant. In one embodiment, the first plunger is positioned so that one end thereof is located within a recess that surrounds the main outlet port. The force may be applied to the first plunger by mounting a main cap for closing off the main outlet port to the fire hydrant. In one embodiment, the main cap mounted to the fire hydrant is a locking cap, e.g., locking cap 106 shown in, for example, FIGS. 10A and 10B, and the peripheral portion of the locking cap that contacts the first plunger applies the force thereto.

In operation 204, in response to the force applied to the first plunger, a second plunger is actuated into an area proximate to an auxiliary outlet port of the fire hydrant. In one embodiment, the first and second plungers are part of a plunger assembly, e.g., plunger assembly 110 (see, for example, FIG. 7), and the force applied to the first plunger causes the second plunger to move into an extended position (see, for example, FIG. 8B). In this extended position, one end of the second plunger is located at a predetermined distance within a recess that surrounds the auxiliary outlet port.

The method continues in operation 206 in which an side cap for closing off the auxiliary outlet port is mounted to the fire hydrant body by rotating the cap in a first direction while the second plunger is in the extended position. In one embodiment, the side cap for closing off the auxiliary outlet port is a side cap provided with ratchet teeth, e.g., side cap 108 shown in, for example, FIGS. 9A and 9B. In this embodiment, the side cap is threaded onto a complementarily-threaded cylinder that defines the auxiliary outlet port (see, for example, cylinder 114a in FIG. 1) by rotating the side cap in a clockwise direction. As the side cap is rotated, the ratchet teeth engage the second plunger because, in the extended (i.e., actuated) position, the predetermined distance at which one end of the second plunger is located within the recess surrounding the auxiliary outlet port is selected to ensure that the ratchet teeth contact the second plunger during rotation. Even though the ratchet teeth engage the second plunger, the side cap can still be rotated in the clockwise direction because, as described above with reference to FIGS. 8C and 9B, the leading face of each of the ratchet teeth is configured to cause ratcheting movement of the side plunger. Thus, in this manner, the cap for closing off the auxiliary outlet port is allowed to be mounted and secured to the fire hydrant body while the second plunger is in the extended position.

In operation 208, the cap is prevented from being removed from the fire hydrant by rotating the cap in a second direction while the second plunger is in the actuated position. In one embodiment, when an attempt is made to rotate the side cap in a counterclockwise direction to remove the side cap from the fire hydrant, the ratchet teeth engage the second plunger. In the case of counterclockwise rotation, however, the trailing face of each of the ratchet teeth engages the second plunger. As described above with reference to FIGS. 8B and 9B, the configuration of the trailing face of each of the ratchet teeth does not trigger any ratcheting movement of the side plunger. Consequently, when the trailing face of one of the ratchet teeth contacts the side plunger, the side plunger blocks any further rotation of the side cap in the counterclockwise direction. Thus, in this manner, the auxiliary cap for closing off the auxiliary outlet port is prevented from being removed from the fire hydrant body while the second plunger is in the actuated position.

The method continues in operation 210 in which the force applied to the first plunger is released to cause the second plunger to retract from the extended position. In the case where the force applied to the first plunger is applied by a locking cap, e.g., locking cap 106 shown in, for example, FIGS. 10A and 10B, fastened to the fire hydrant, the force may be released by removing the locking cap from the fire hydrant. In one embodiment, locking mechanism 124 (see, for example, FIG. 3C) of locking cap 106 is moved into the unlocked position using opening tool 118 (see, for example, FIG. 6B). With locking mechanism 124 in the unlocked position, locking cap 106 can be removed from the fire hydrant.

Once locking cap 106 has been removed from the fire hydrant, the first plunger will move back into an extended position (i.e., the preloaded condition shown in FIGS. 7 and 8A). This movement of the first plunger in turn causes the second plunger to assume the preloaded condition in which the second plunger is in a retracted position (i.e., the position of side plunger 178 shown in FIGS. 7 and 8A). In operation 212, the cap is removed from the fire hydrant by rotating the cap in the second direction. In the case where the cap is a side cap, e.g., side cap 108 shown in, for example, FIGS. 9A and 9B, the side cap is removed by rotating the side cap in the counterclockwise direction. With the second plunger in the retracted position, the ratchet teeth of the side cap do not come into contact with the second plunger (compare the relative positions of side plungers 178 in FIGS. 10A and 10B). As such, the side cap can be freely rotated in the counterclockwise direction. Thus, in this manner, the cap is removed from the fire hydrant by rotating the cap in the second direction. Once the cap for closing off an auxiliary outlet port has been removed from the fire hydrant, the method is done.

In summary, the present invention provides a locking fire hydrant that includes, among other features, an internal latching mechanism that can be actuated by a locking cap to secure an auxiliary cap to the fire hydrant. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims and equivalents thereof.

What is claimed is:

1. A method for securing an auxiliary cap to a fire hydrant, comprising:
   mounting a locking cap for closing off a main outlet port of a fire hydrant on the fire hydrant; and
   actuating an internal latching mechanism to engage an area proximate to an auxiliary outlet port of the fire hydrant, wherein actuating the internal latching mechanism includes:
      depressing a first plunger of a plunger assembly disposed in an internal channel in a body of the fire hydrant, the internal channel being separate from and adjacent to the main outlet port, the first plunger being depressed by the locking cap, the internal channel having a proximate end adjacent to the main outlet port and a distal end adjacent to the auxiliary outlet port; and
      moving a second plunger of the plunger assembly into an actuated position, wherein the actuated position, prevents the auxiliary cap disposed on the auxiliary outlet port from rotating in at least one direction.

2. The method of claim 1, wherein the auxiliary cap engages the internal latching mechanism engaged in the area proximate to the auxiliary outlet port.

3. The method of claim 2, wherein the auxiliary cap includes a plurality of teeth for engaging the internal latching mechanism.

4. The method of claim 2, wherein the auxiliary cap includes a plurality of teeth for engaging the internal latching mechanism, at least one of the plurality of teeth engage the latching mechanism so as to allow the auxiliary cap to rotate in a first direction while preventing the auxiliary cap from rotating in a second direction.

5. An auxiliary cap latching mechanism on a fire hydrant comprising:
   an internal channel in a body of the fire hydrant, the internal channel being separate from and adjacent to a main outlet port of the fire hydrant, the internal channel having:
      a proximate end adjacent to the main outlet port of the fire hydrant; and
      a distal end in adjacent to an auxiliary outlet port; and
   a plunger assembly slideably disposed in the internal channel, the plunger assembly including:
      a first plunger disposed in a proximate end of the plunger assembly, the first plunger extending through the proximate end of the internal channel and into the main outlet port when in a non-depressed configuration;
      a second plunger disposed in a distal end of the plunger assembly, the second plunger extending through the distal end of the internal channel and into the auxiliary outlet port when in a non-depressed configuration; and
      at least one spring disposed between the first plunger and the second plunger.

6. The mechanism of claim 5, wherein the plunger assembly includes a sleeve, the first plunger and the second plunger slideably disposed within the sleeve.

7. The mechanism of claim 6, wherein the first plunger has a stepped configuration that defines a wide portion and a narrow portion, wherein an end of the wide portion protrudes from the sleeve and has a generally rounded configuration.

8. The mechanism of claim 7, wherein the second plunger has a stepped, cylindrical configuration, which defines a narrow portion and a wide portion, the narrow portion protruding from the sleeve.

9. The mechanism of claim 8, wherein the first plunger and the second plunger are arranged within the sleeve such that first plunger is received within the second plunger and wherein the spring is disposed within the sleeve and wherein the spring is further disposed within the second plunger such that the spring is in contact with the step defined in the first plunger and the step defined in the second plunger.

10. The mechanism of claim 5, further comprising an auxiliary cap including a surface for engaging an internal latching mechanism in an area proximate to the auxiliary outlet port.

11. The mechanism of claim 10, wherein the surface for engaging the internal latching mechanism includes a plurality of teeth for engaging the internal latching mechanism.

12. The mechanism of claim 10, wherein the surface for engaging the internal latching mechanism includes a plurality of teeth for engaging the internal latching mechanism, wherein at least one of the plurality of teeth engage the latching mechanism so as to allow the auxiliary cap to rotate in a first direction while preventing the auxiliary cap from rotating in a second direction.

13. A method for securing an auxiliary cap to a fire hydrant, comprising:
applying force to a first plunger disposed proximate to a main outlet port of a fire hydrant to cause a second plunger to assume an extended position in which the second plunger extends into an area proximate to an auxiliary outlet port of the fire hydrant;
allowing the auxiliary cap for closing off the auxiliary port to be threadably fastened to the fire hydrant by rotating the auxiliary cap in a first direction while the second plunger is in the extended position;
preventing the auxiliary cap from being threadably removed from the fire hydrant by rotating the auxiliary cap in a second direction while the second plunger is in the extended position;
releasing the force applied to the first plunger to cause the second plunger to retract from the extended position; and
threadably removing the auxiliary cap from the fire hydrant by rotating the auxiliary cap in the second direction.

14. The method of claim 13, wherein the first direction is a clockwise direction and the second direction is a counter-clockwise direction.

15. The method of claim 13, wherein the applying of force to the first plunger includes:
mounting a locking cap for closing off the main outlet port to the fire hydrant.

16. The method of claim 15, wherein the releasing of the force applied to the first plunger includes:
removing the locking cap from the fire hydrant.

17. The method of claim 13, wherein the allowing of the auxiliary cap for closing off the auxiliary port to be threadably fastened to the fire hydrant includes:
causing ratcheting movement of the second plunger during rotation of the auxiliary cap.

* * * * *